Feb. 27, 1968 S. B. GRISCOM 3,371,144
TRANSMISSION-LINE LIGHTNING-PROOFING STRUCTURES
Filed Feb. 26, 1963 22 Sheets-Sheet 1

WITNESSES
Theodore F. Wrobel
Bernard R. Gieguay

INVENTOR
Samuel B. Griscom
BY
Willard R. Crout
ATTORNEY

Feb. 27, 1968 S. B. GRISCOM 3,371,144
TRANSMISSION-LINE LIGHTNING-PROOFING STRUCTURES
Filed Feb. 26, 1963 22 Sheets-Sheet 8
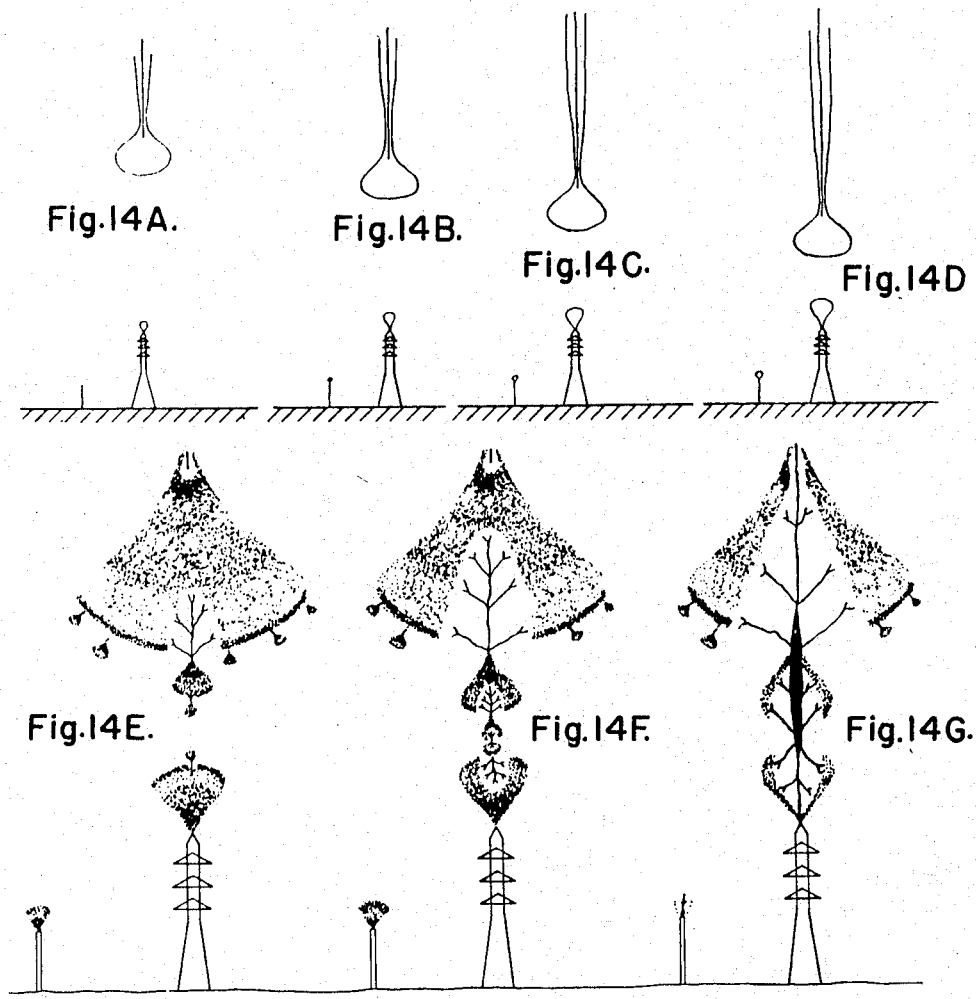
Fig.14A. Fig.14B. Fig.14C. Fig.14D
Fig.14E. Fig.14F. Fig.14G.
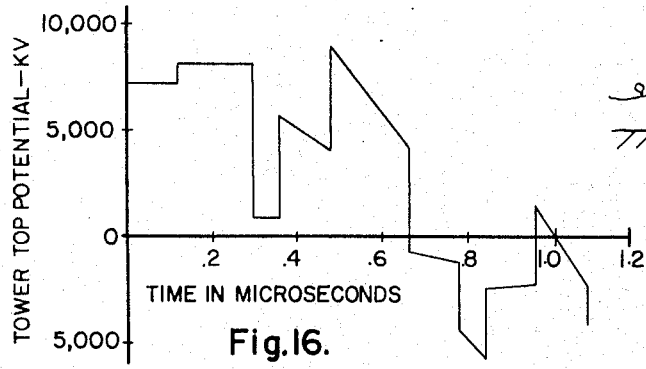
Fig.16.
TOWER TOP POTENTIAL-KV
TIME IN MICROSECONDS
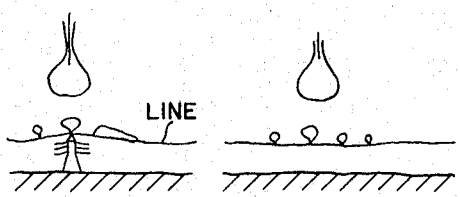
Fig.17

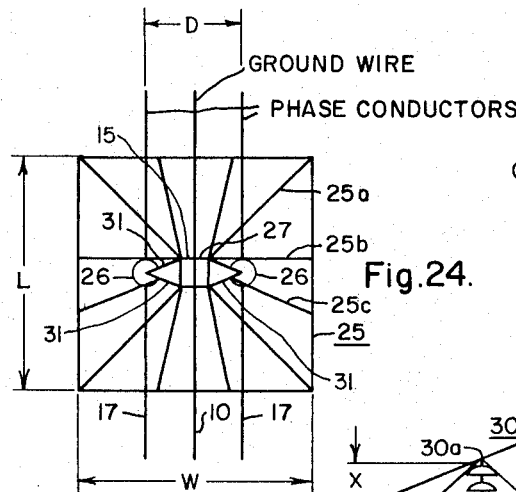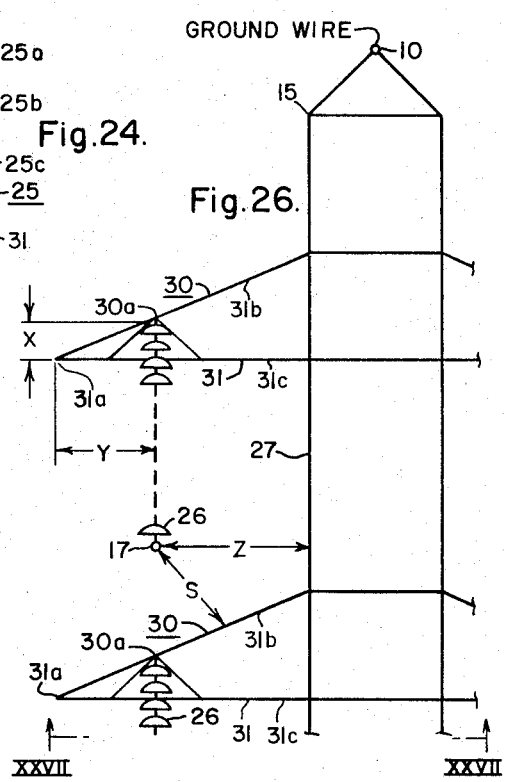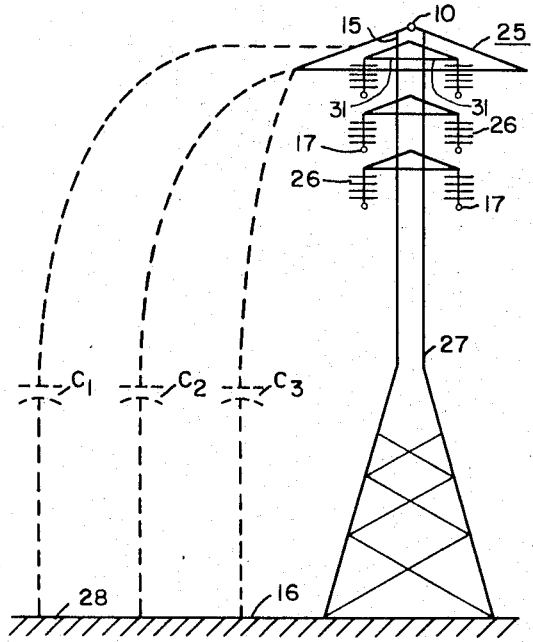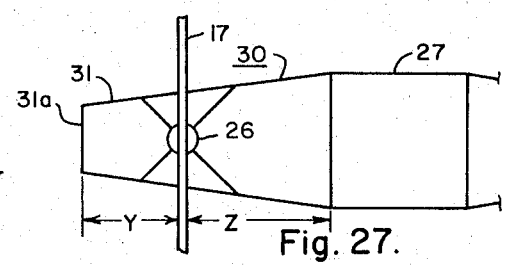

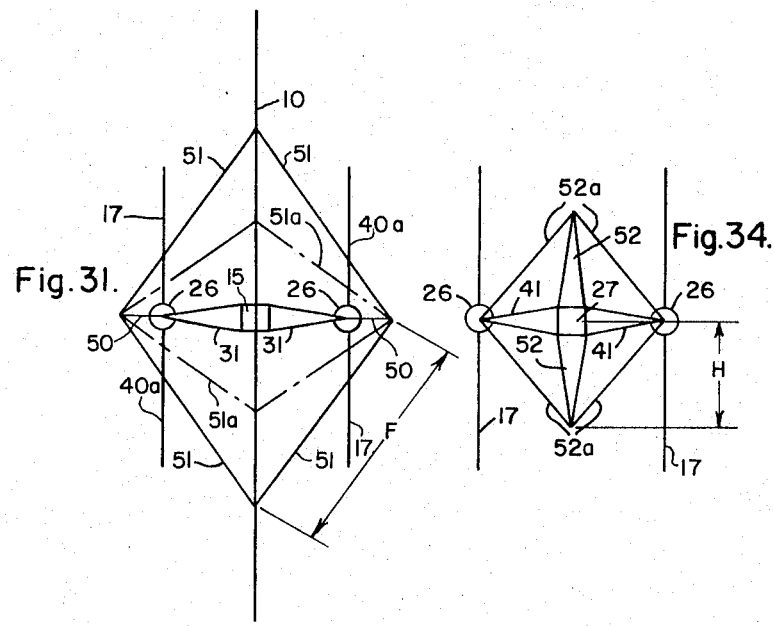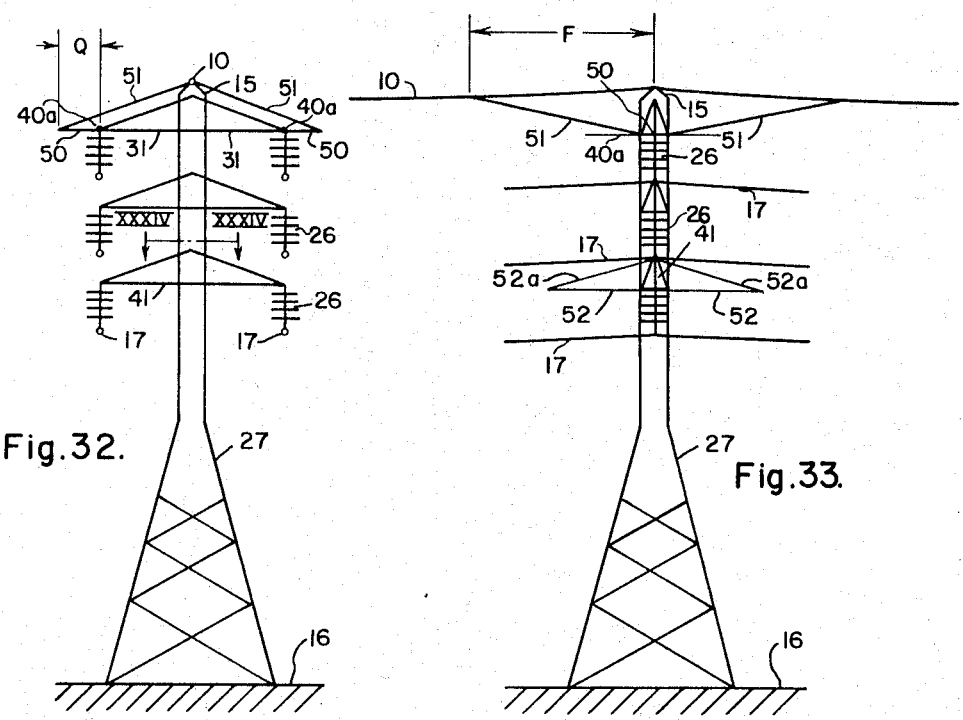

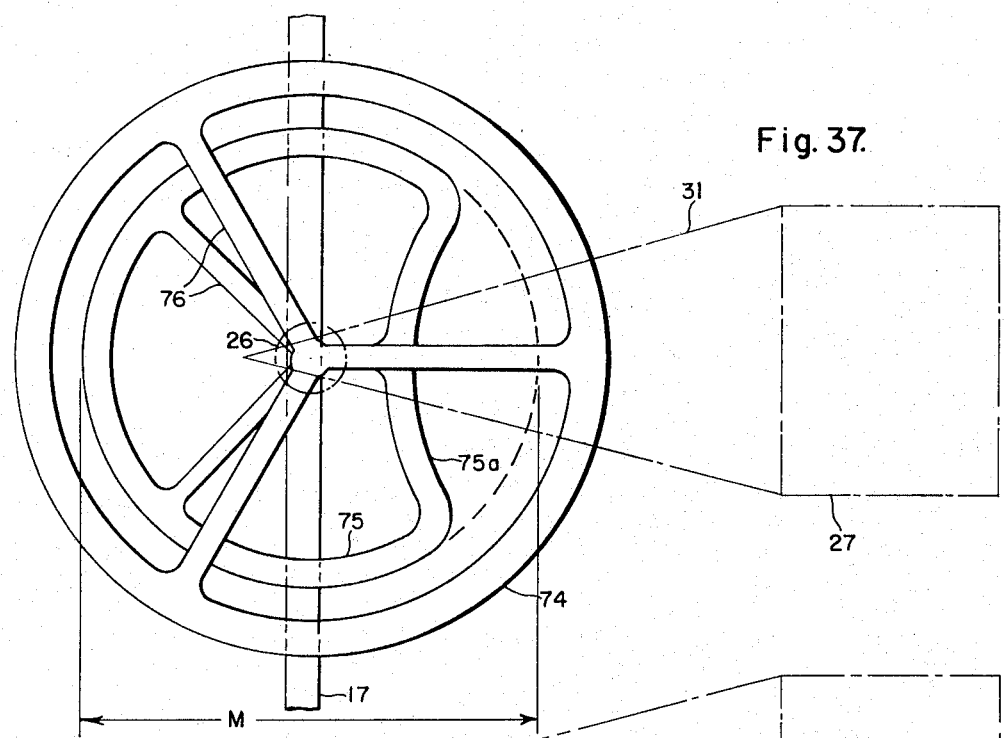
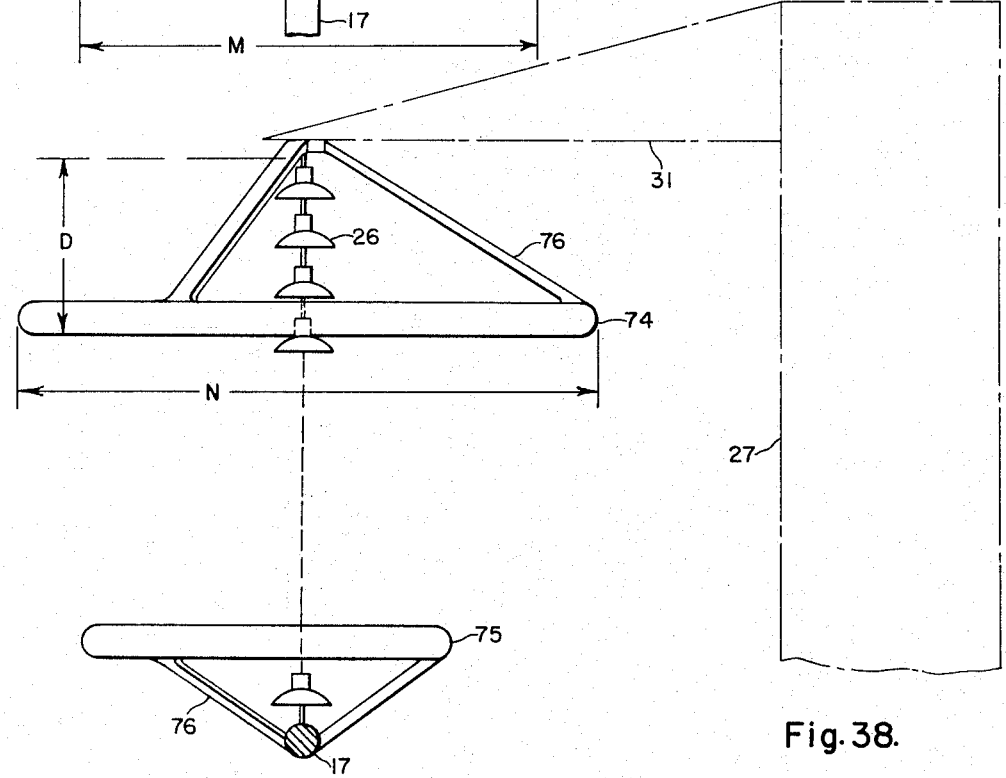
Fig. 37.
Fig. 38.

GROUND WIRE AND PHASE CONDUCTOR (SUPERIMPOSED)

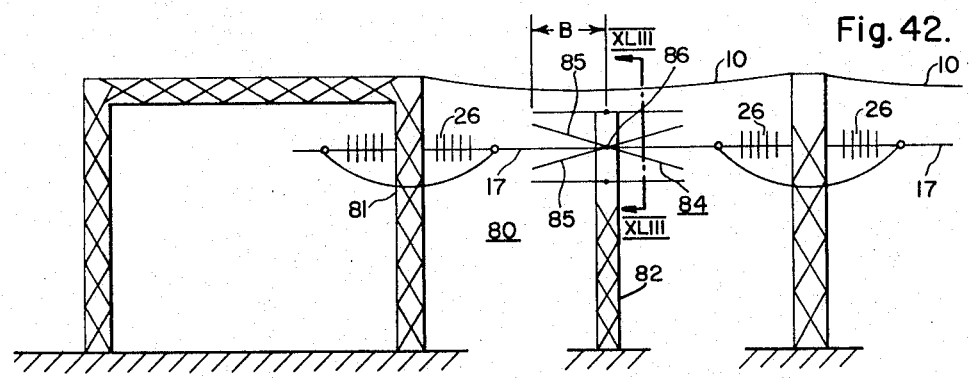
Fig. 42.
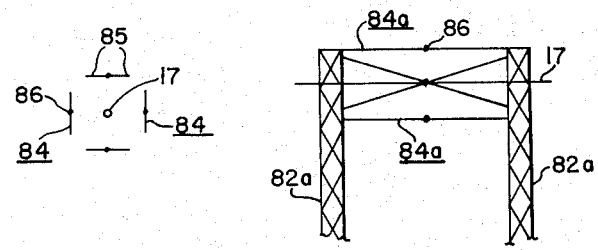
Fig. 43.
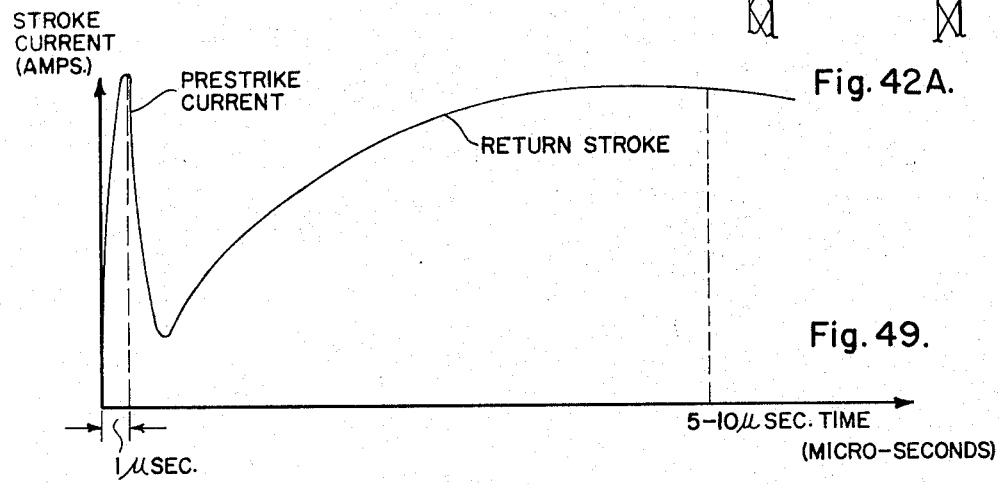
Fig. 42A.
Fig. 49.
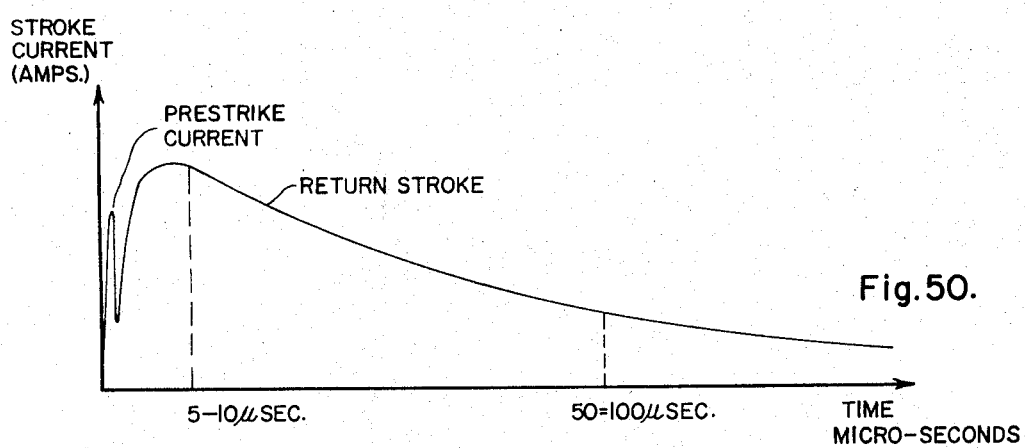
Fig. 50.

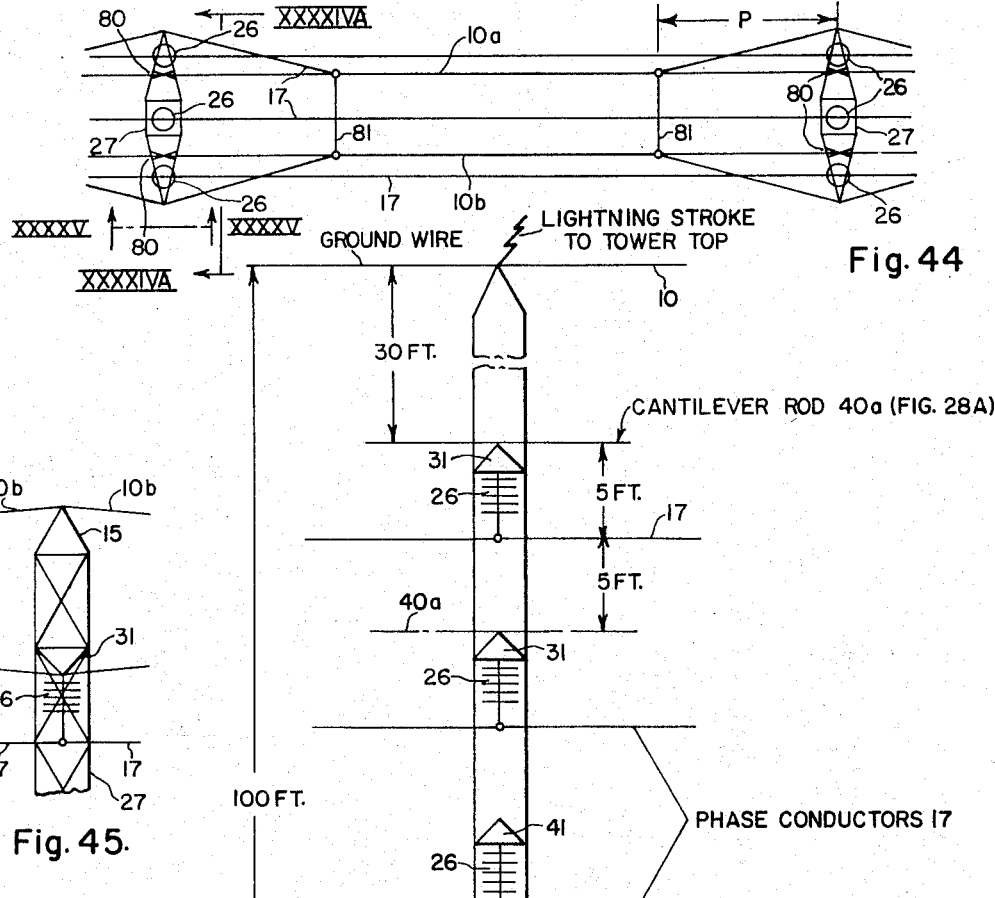
Fig. 44
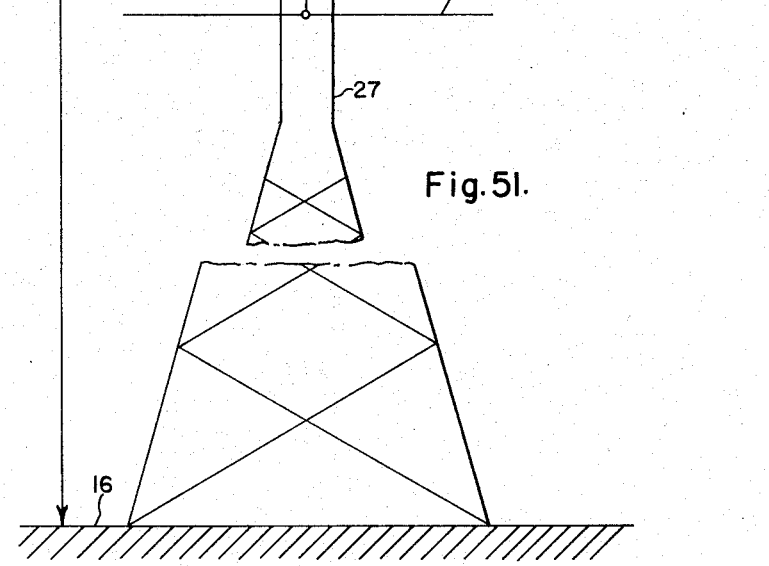
Fig. 45.
Fig. 51.

Feb. 27, 1968     S. B. GRISCOM     3,371,144
TRANSMISSION-LINE LIGHTNING-PROOFING STRUCTURES
Filed Feb. 26, 1963     22 Sheets-Sheet 22

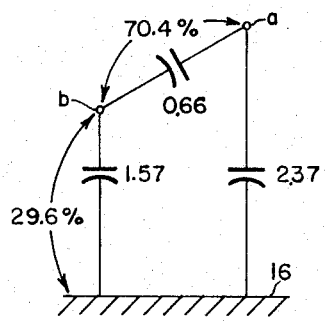

GROUND WIRE ALONE
NUMBERS ARE PICO-FARADS
PER FOOT. % ARE DIFFERENCES
IN VOLTAGES WITH THE TOWER TOP

Fig.52.

POTENTIAL TAKEN AS 100%

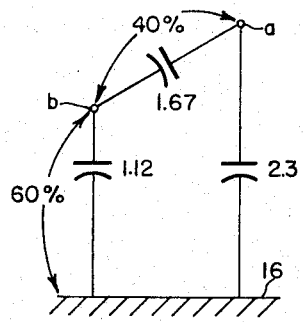

SINGLE CANTILEVER ROD 40a (FIG.28A)
EACH SIDE TOP CROSS-ARM 31 ONLY

Fig.53.

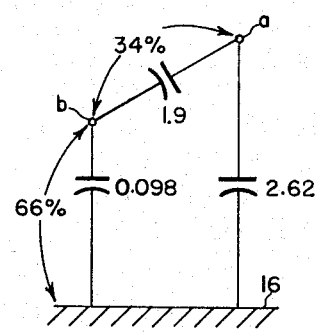

DOUBLE, CROSSED CANTILEVER RODS 40 (FIG.28)
EACH SIDE, TOP CROSS-ARM 31 ONLY

Fig.54.

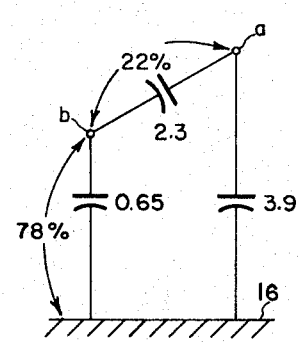

DOUBLE, CROSSED CANTILEVER RODS 40 (FIG.28)
EACH SIDE. TOP AND MIDDLE CROSS-ARMS 31.

Fig.55.

United States Patent Office 3,371,144
Patented Feb. 27, 1968

3,371,144
TRANSMISSION-LINE LIGHTNING-PROOFING STRUCTURES
Samuel B. Griscom, Wilkinsburg, Pa., assignor to Westinghouse Electric Corporation, Pittsburgh, Pa., a corporation of Pennsylvania
Filed Feb. 26, 1963, Ser. No. 261,139
24 Claims. (Cl. 174—2)

This invention relates, in general, to structures for effecting lightning proofing of transmission lines, and, more particularly, to improved structural hardware items and equipment which may be affixed to the transmission-line towers, or crossarms thereof, to assist in affecting the electrostatic coupling of the tower-top and grounding-wire system to the phase conductors to thereby reduce the effective voltage drop across insulator strings, or like insulation equipment, and thereby reduce the possibility of flashover lengthwise of the insulator string, or similar equipment, during the occurrence of lightning strokes to the tower or to the transmission line. Certain aspects of the invention have important relation to modifications of substation structures to secure like benefits.

A general object of the present invention is to provide improved structures to effect lightning proofing of transmission-line and substation structures.

As well known by those skilled in the art, lightning is the large spark, or visible light produced by an abrupt discontinuous discharge of electricity through the air, generally under turbulent conditions of the atmosphere. Overhead lines of electric power companies are vulnerable to lightning. Lightning effects appear on these lines as transient voltages, which, if of sufficient magnitude, will either flash over or puncture the weakest point in the system insulation. A puncture of the insulation obviously requires repair work, and damaged apparatus must be removed from service. The problem of lightning damage to electric power systems and equipment is an ever-present one, and it is another purpose of the present invention to reduce, or greatly minimize, the number of outages occurring on electric power systems or in substations.

Another object of the present invention is to apply the principles of the "prestrike theory," more fully explained hereinafter, in evolving structures, which will have a beneficial effect on the lightning proofing of transmission lines, substations, switchgear and related devices.

Yet a further object of the invention is to provide suitably-configured hardware items and equipment, which may readily be attached to existing transmission-tower structures without difficulty, as well as to new transmission-line facilities.

As well known by those skilled in the art, the effects of lightning strokes to transmission systems have been outages, and hazardous incident conditions to operating personnel, as well as untold inconvenience and expense to utility customers, many of which, such as metal processors, chemical plants, oil refineries, glass factories, and the like, need an uninterrupted supply of power for their operations. An outage, due to a lightning stroke, causes an expensive concomitant shutdown of equipment, spoilage of material in process, and protracted restart periods (up to 2 weeks), with incident hardship to all. Accordingly, a further object of the present invention is the provision of certain readily-attached equipment to transmission-tower structures, switchgear and substation installations which will tend to eliminate or considerably reduce, the resultage outages which ensue due to lightning strokes to the associated lines and equipment.

The "prestrike theory" predicts a steep-fronted short-duration high-magnitude current into a transmission-line tower, or ground wire, followed by a slower-fronted, longer-duration current a short time thereafter. The prestrike theory is presented hereinafter more fully, but to give concrete meaning to the generic adjective used above, the front of a prestrike may be within the range of 0.1 to 1.0 microseconds; and the prestrike duration of 0.5 to 2.0 microseconds. The return stroke, following the prestrike, may have a front of 2.0 to 10.0 microseconds and a duration (up to ½ value) of 20 to 200 microseconds.

The conventional method of calculating transmission-line flashover performance due to lightning is set forth in "A Method of Estimating Lightning Performance of Transmission Lines," AIEE Committee Report. AIEE transactions, volume 69 pt. II, 1950, pp. 1187–96. This is known as the "AIEE method." Generally, transmission-lines designed according to the AIEE method have brought about a large reduction of transmission-line flashovers due to lightning. This, of course, has been of tremendous economic value to the electrical utility industry. On the other hand, there has recently been a number of instances of high flashover rates, which indicate that existing data and/or the existing AIEE theory must have significant discrepancies. It is believed that the prestrike theory accounts for these differences. Additionally, it is my belief that the substantial reduction in flashover rate, previously referred to, is due almost entirely to ground-wire shielding and reduction of tower-footing resistance.

The lightning-stroke preventive structures, hereinafter disclosed, are particularly directed toward reducing, or eliminating flashovers due to the greater ratio of change of lightning stroke current predicted by the prestrike theory. Several different structures are proposed which may be used singly, or in combination to achieve a greater degree of invulnerability to lightning strokes. The question is of particular importance when the transmission-line is at extra high voltage (EHV), and since such lines handle such large amount of power, the economic value of the proposed lightning-proofing structures is particularly important.

Further objects and advantages will readily become apparent upon reading the following specification, taken in conjunction with the drawings, in which.

Figure 10:
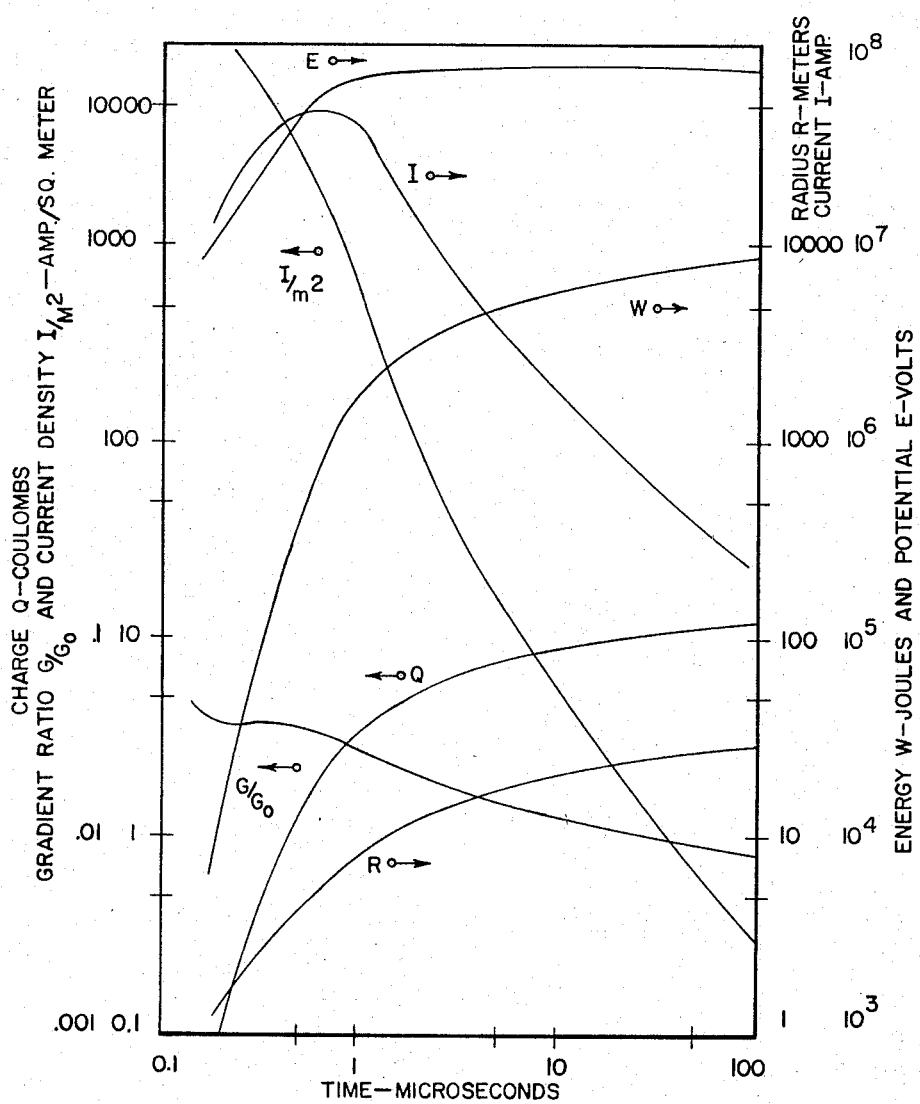
Figure 11:
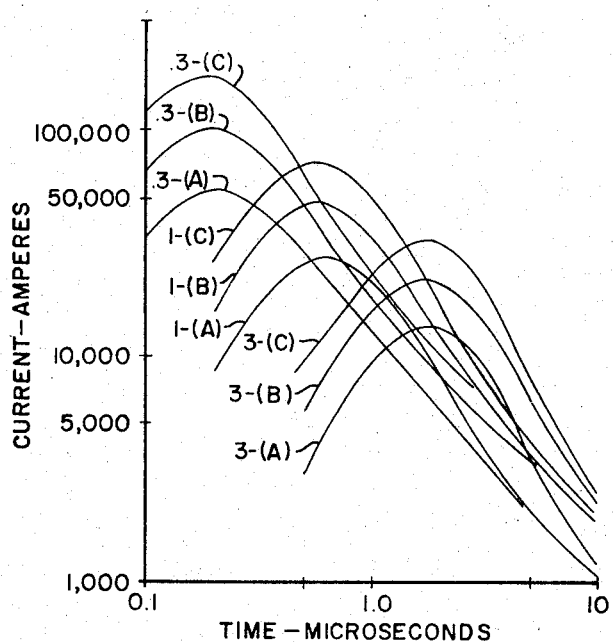
Figure 12A:
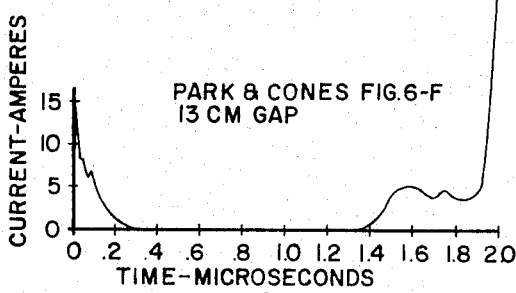
Figure 12C:
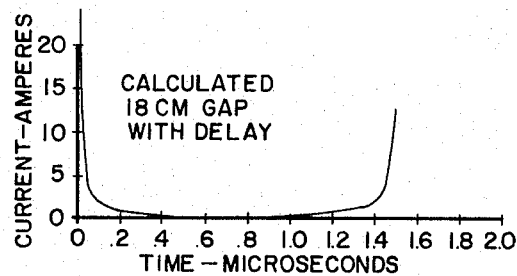
Figure 12B:
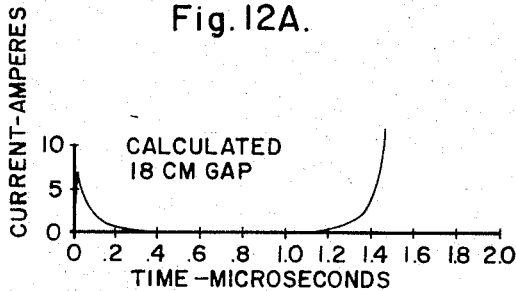
Figure 12D:
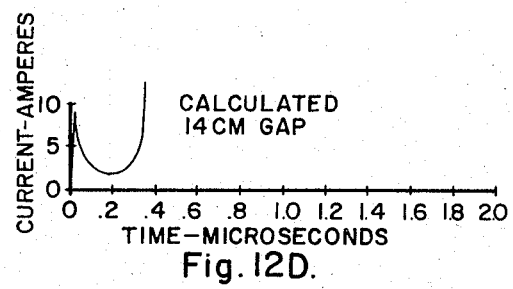
Figure 15A:
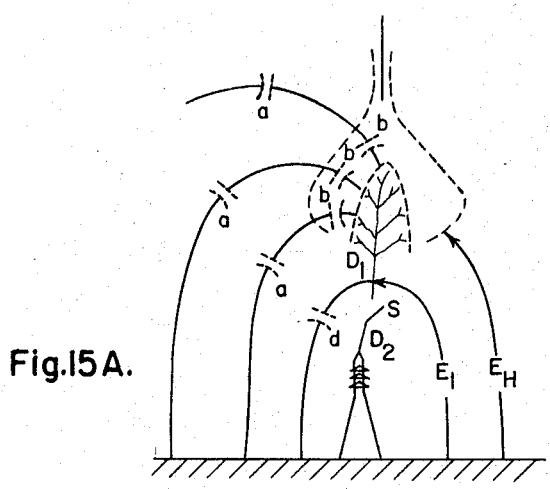
Figure 15B:
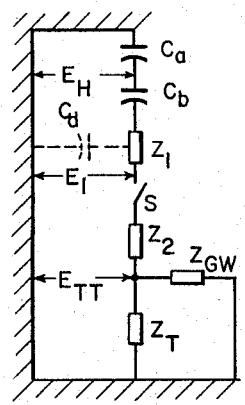
Figure 18A:
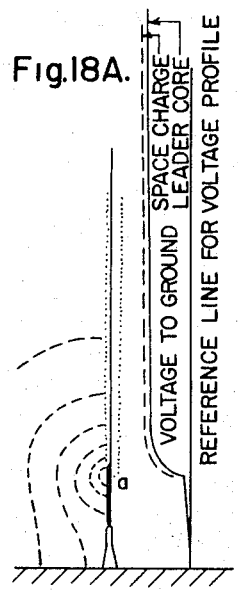
Figure 18B:
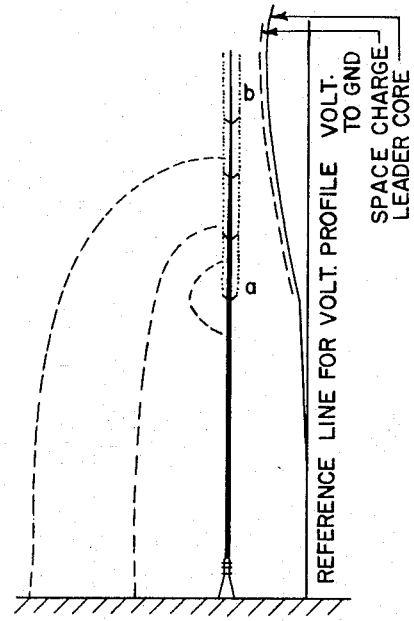
Figure 19A:
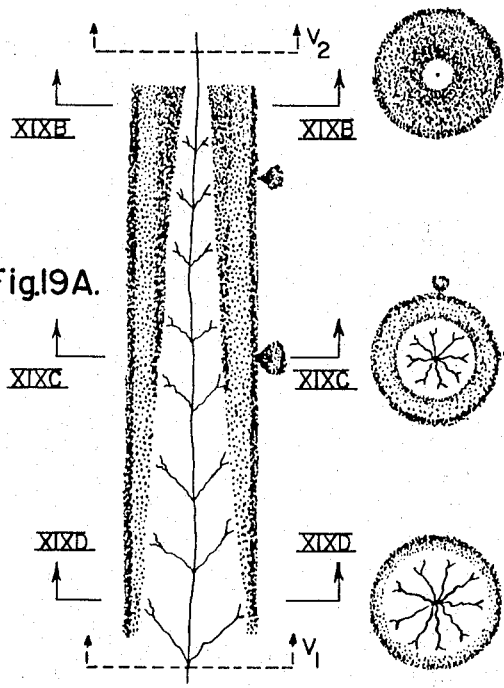
Figure 19B:
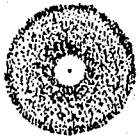
Figure 19C:
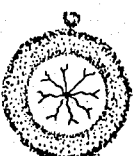
Figure 19D:
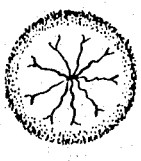
Figure 20:
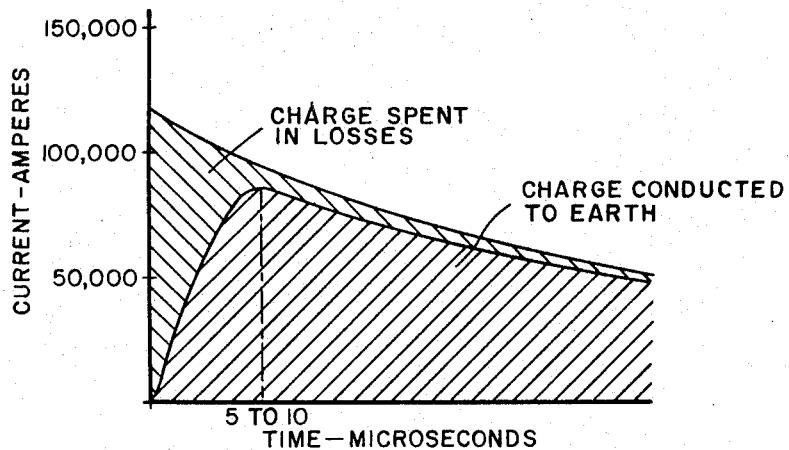
Figure 21:
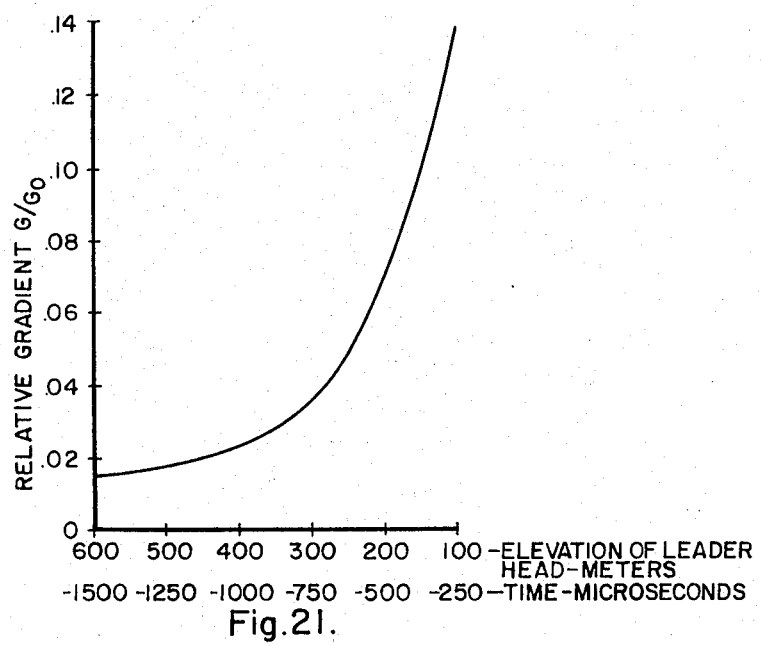
Figure 22:
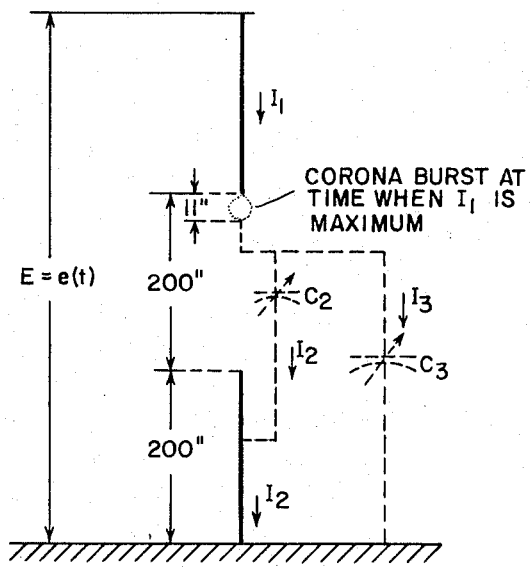
Figure 23:
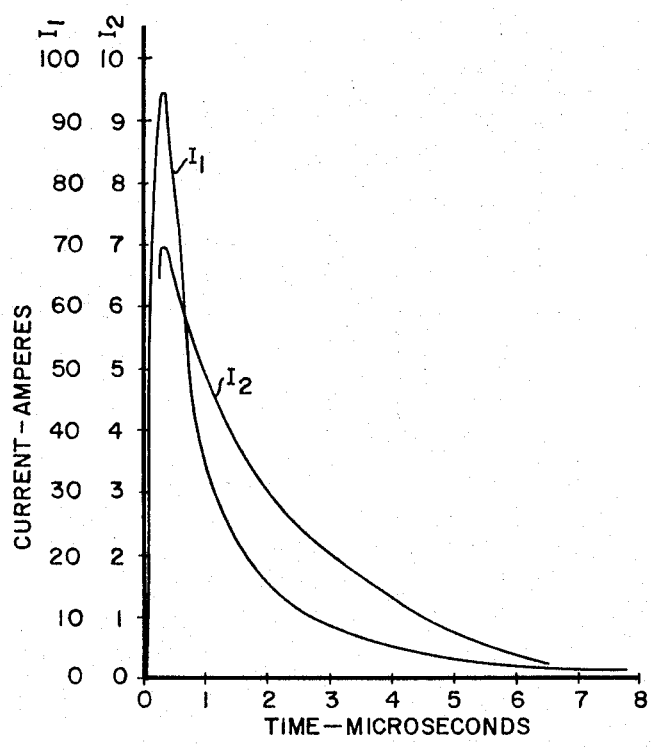
Figure 28:
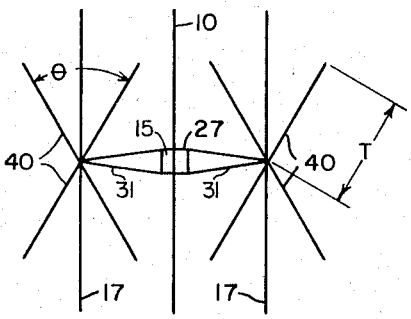
Figure 28A:
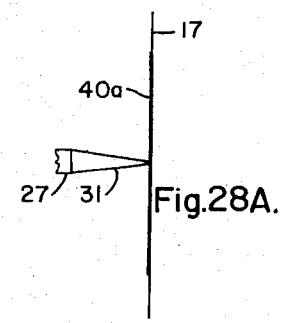
Figure 29:
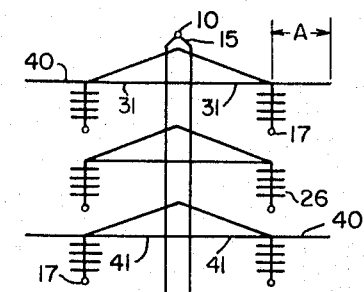
Figure 30:
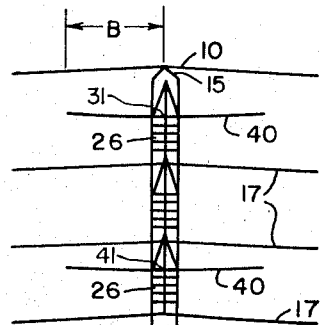
Figure 35:
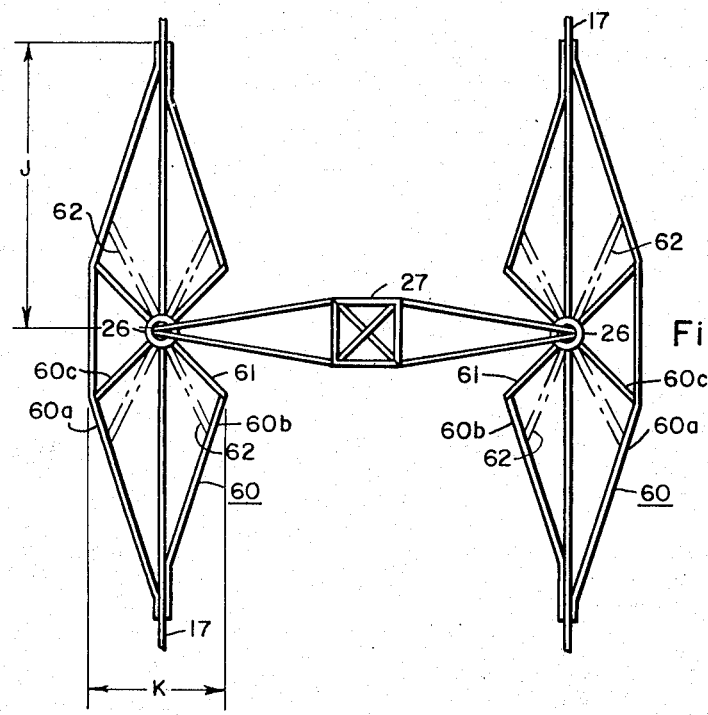
Figure 36:
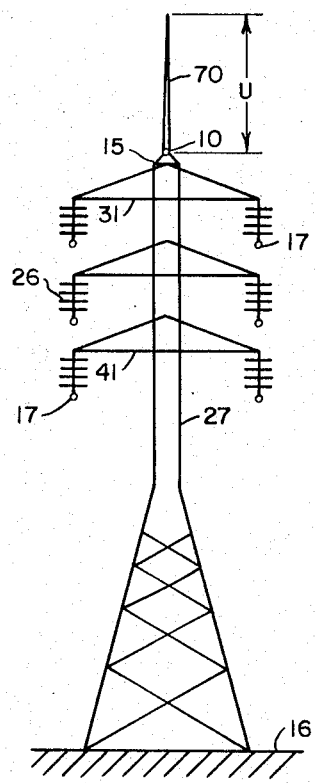
Figure 39:
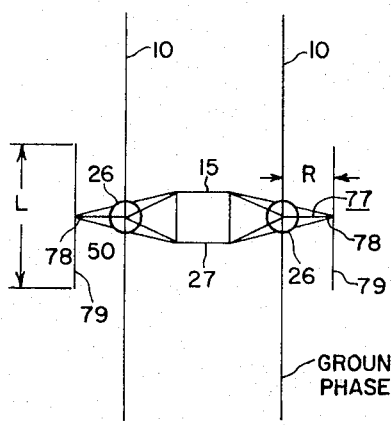
Figure 40:
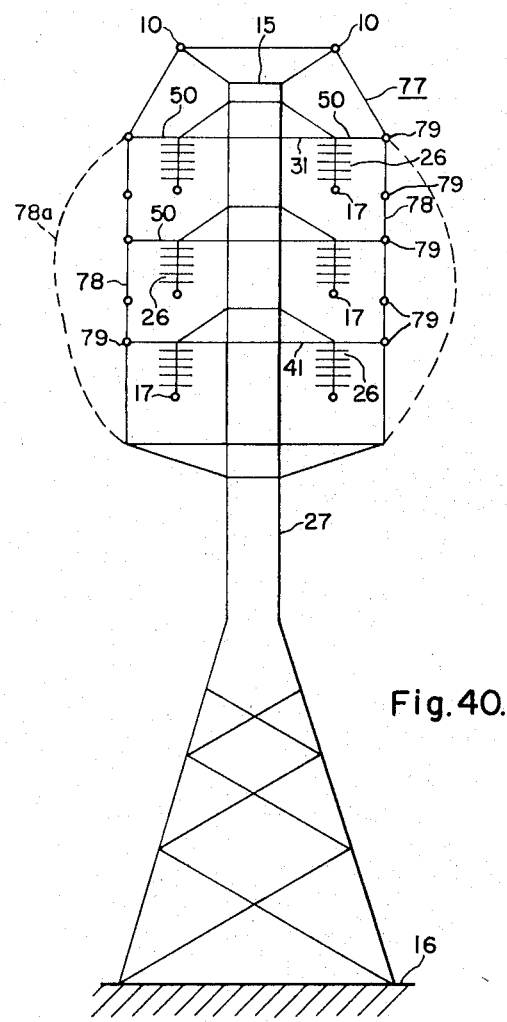
Figure 44A:
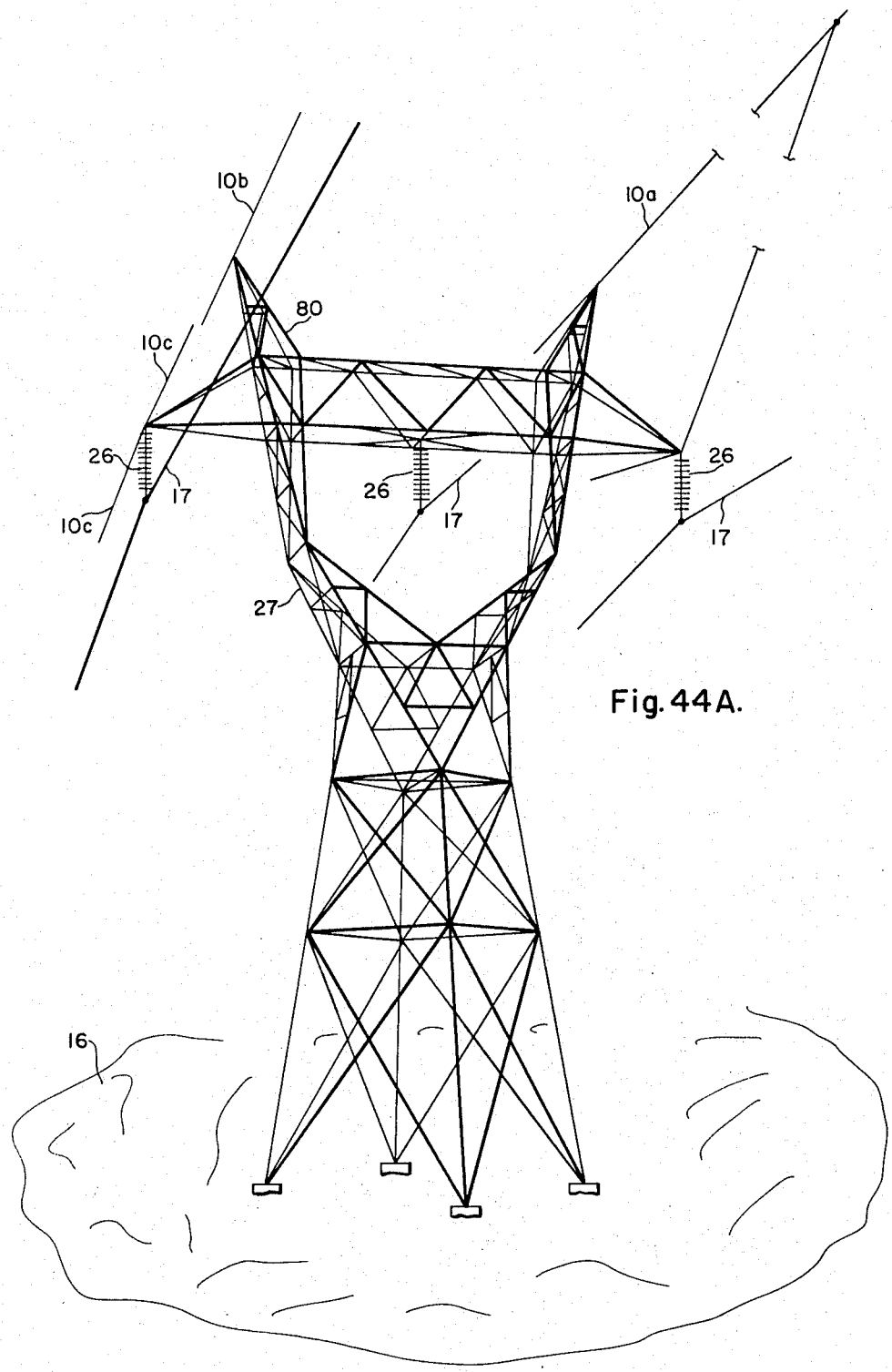
Figure 46:
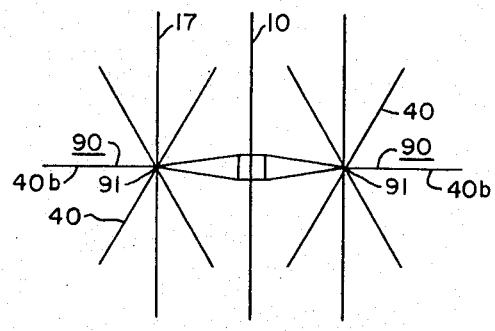
Figure 47:
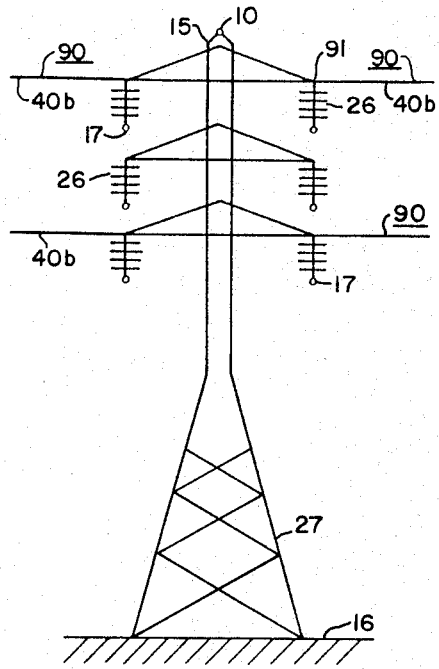
Figure 48:
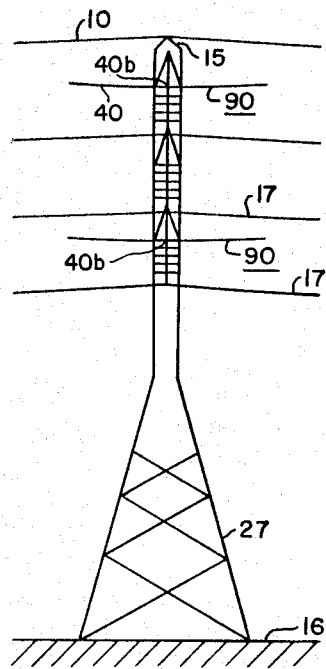

FIG. 10 graphically illustrates calculated characteristics of leader-head corona burst;

FIG. 11 graphically illustrates leader-head corona-burst current as influenced by propagation velocity and rate of voltage application. Numbers are microseconds to 90% of voltage crest; letters refer to the curves of FIG. 8;

FIG. 12A graphically illustrates comparison of tests and FIGS. 12B–12D illustrate calculations;

FIGS. 13A–13F diagrammatically illustrate the concept of the stepping process of the initial leader with the specks representing negative space charge of corona burst;

FIGS. 14A–14G diagrammatically illustrate successive positions of the leader head approaching a tower and the concept of prestrike discharge process of the leader head;

FIG. 15A diagrammatically illustrates the pictorial circuit for calculation of prestrike current and tower-top voltage;

FIG. 15B illustrates the equivalent electrical circuit for calculation of prestrike current and tower-top voltage;

FIG. 16 graphically illustrates a typical calculated prestrike voltage-time curve;

FIG. 17 pictorially illustrates a transverse view of a leader head approaching a transmission line;

FIG. 18A diagrammatically illustrates the concept of the early stage of electric flux lines and leader-core voltage profiles;

FIG. 18B diagrammatically illustrates a later stage of electric flux lines and leader-core voltage profile;

FIG. 19A collectively illustrates the concept of space charge around the leader core; the figure being greatly foreshortened vertically for clarity;

FIGS. 19B–19D illustrate cross sectional views through the leader core of FIG. 19A illustrating space charge phenomena;

FIG. 20 graphically illustrates the charge neutralization rate during the return stroke;

FIG. 21 graphically illustrates the gradient ratio at the earth's surface as a leader head, charged to $80 \times 10^6$ voltage, approaches;

FIG. 22 graphically illustrates an electrode configuration used in calculating the curves of FIG. 23;

FIG. 23 graphically illustrates calculated and measured values of current for the electrode configuration of FIG. 22;

FIG. 24 illustrates a top plan view of a capacity hat as applied to the top of a transmission-line tower;

FIG. 25 illustrates a side elevational view of the transmission-line tower and the capacity hat of FIG. 24;

FIG. 26 illustrates an improved crossarm attachment design for securement of an insulator-string assemblage for a high-voltage phase conductor;

FIG. 27 illustrates a bottom plan view of the phase-conductor attachment arrangement of FIG. 26;

FIG. 28 illustrates a top plan view of a modified cantilever-rod construction, as applied to the lower side of the top and lower crossarms of a transmission-tower structure;

FIG. 28A illustrates a slightly modified cantilever-rod arrangement for the tower structure of FIG. 28;

FIG. 29 is a side elevational view of the transmission-line tower structure of FIG. 28, illustrating the disposition of the cantilever-rod construction relevant to the ground and phase conductors;

FIG. 30 is a longitudinal side elevational view of the cantilever-rod construction of FIGS. 28 and 29;

FIG. 31 illustrates a top plan view of an aerial cage as applied to the upper end of a transmission-tower structure;

FIG. 32 is a transverse elevational view of the aerial cage illustrated in FIG. 31 looking lengthwise of the ground and phase conductors;

FIG. 33 illustrates a side elevational view of the transmission-tower structure of FIGS. 31 and 32;

FIG. 34 is a sectional plan view taken along the line XXXIV—XXXIV of FIG. 32;

FIG. 35 illustrates cage wires, or spreaders, applied to the power conductors, as secured to a transmission-tower structure;

FIG. 36 illustrates a side elevational view of a transmission-tower structure, looking lengthwise of the ground and phase conductors, and illustrating a vertical mast arrangement;

FIG. 37 is a top plan view of an extra-large grading-ring construction, as applied to the insulator strings of a transmission-line supporting structure;

FIG. 38 is a side elevational view of the grading-ring construction of FIG. 37;

FIGS. 39–40 illustrate, respectively, top plan, side-elevational, and end views of a combined shielding and cantilever-rod arrangement as applied in lightning proofing a transmission-tower structure;

FIG. 42 illustrates a modified-type substation supporting arrangement illustrating a further embodiment of a cantilever-rod construction;

FIG. 42A is a modified type substation structure;

FIG. 43 illustrates a cross-sectional view taken substantially along the line XLIII—XLIII of the substation cantilever-rod construction illustrated in FIG. 42;

FIG. 44 illustrates a top plan view of a modified-type of aerial cage structure using the ground wires and outriggers;

FIG. 44A is a perspective view of a tower as taken along the line XXXXIVA—XXXXIVA of FIG. 44;

FIG. 45 is a fragmentary side view of the aerial cage arrangement of FIG. 44;

FIGS. 46–48 illustrate, respectively, top, side and end views of a modified-type cantilever-rod arrangement;

FIG. 49 illustrates graphically a conjectured magnitude of the prestrike current with relation to the front and magnitude of the return stroke;

FIG. 50 illustrates the prestrike current of FIG. 49 on an extended time scale to illustrate the magnitude of the prestrike current relevant to the front and tail portion of the return stroke;

FIG. 51 diagrammatically illustrates a typical transmission-tower structure employing features of the present invention; and, FIGS. 52–55 diagrammatically indicate per-unit-length capacitance values and difference voltages for different cantilever-rod arrangements of FIG. 51.

Evidence has been accumulating in recent years that the AIEE method, as set forth in AIEE Transactions, volume 69, pt. II, 1950, pages 1187–96, is not universally applicable in predicting the lightning flashover performance of transmission lines. Many papers have been written on this subject emphasizing the importance of this problem to the electrical utility industry.

While the work of Schonland and others is basic to the AIEE method, their data are photographic, whereas electrical data are also necessary for analysis. Unfortunately, the available electrical data are not yet of sufficient quality and quantity to define the phenomena adequately. Most of such data is in the form of crest-current values obtained from magnetic links. Recently, some work has been done toward accumulating data on wave-fronts and times to crest, but without full conclusiveness.

I have felt that a review of the work of Schonland might, in the light of subsequent data, suggest new avenues of approach. The step process of the initial leader was found to be of particular interest, but none of the mechanisms so far advanced seemed to fit all the facts. A study of the literature on air breakdown, led to a new concept of the step leader process and in turn to the "prestrike" theory, as presented hereinafter with important commercial applications thereof.

According to this "prestrike" theory, the head of the leader contains a disproportionately large amount of charge compared to a similar length of the leader proper. Dumping this charge into the tower results in a high-amplitude short-duration prestrike current which precedes the "return stroke" current. The effect of the prestrike current on line performance and counteracting measures to be taken are subsequently set forth.

Established terminology is used herein as far as possible. The term "streamer" is not used, however, because different authors appear to have used it to describe varying physical phenomena. A glossary of terms is included in a subsequent section.

1. BASIC CASE

Figure 1:
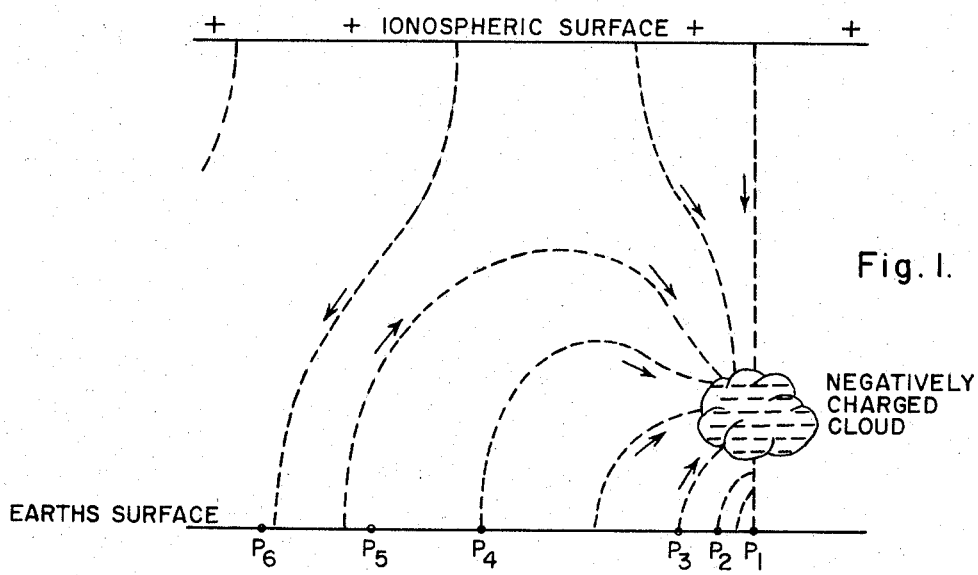
FIGURE 1 is a general view of a typical cloud and leader showing lines of electrostatic flux.
Figure 2:
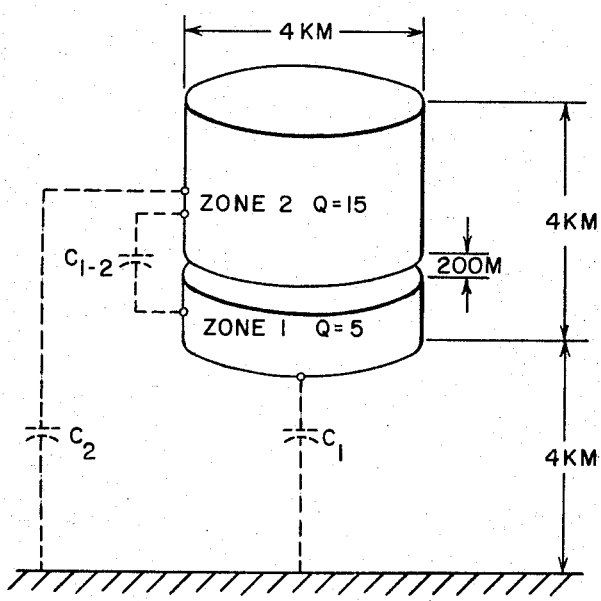
FIG. 2 illustrates the division of the cloud of FIG. 1 in two zones for capacitance determination.

In order to develop illustrative quantities a typical cloud was assumed, and most numerical values given subsequently are based on that chosen example. FIG. 1 shows the cloud in general, and FIG. 2 shows the details of its arbitrary separation into two zones.

Figure 3:
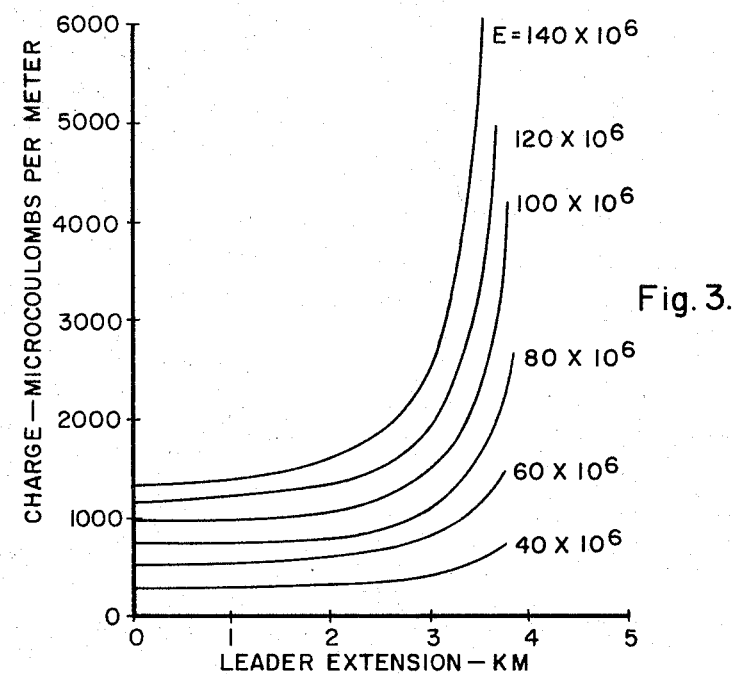
FIG. 3 is a graph illustrating leader-channel charge as affected by its voltage and extension from the cloud.
Figure 4:
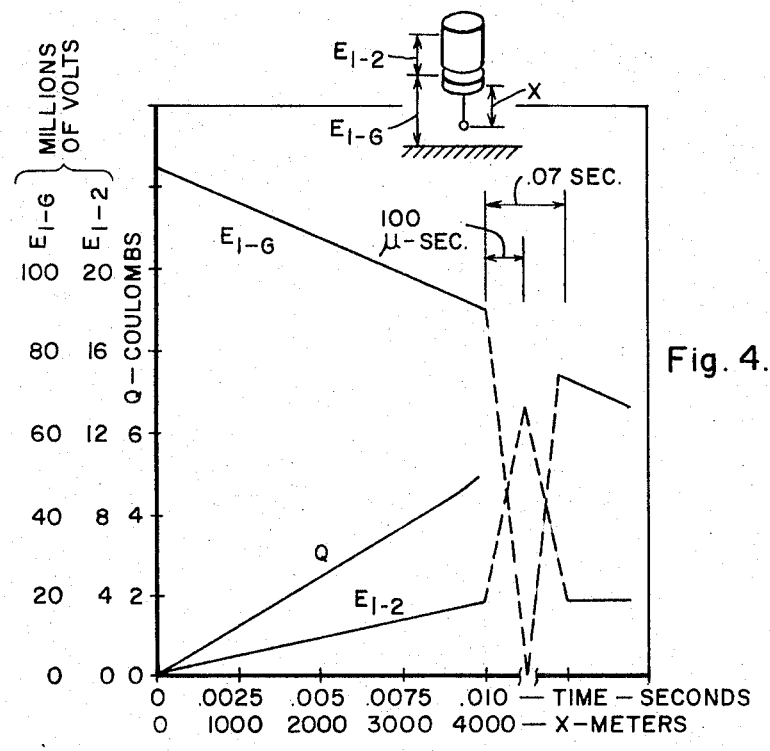
FIG. 4 is a graph illustrating variation of voltages and leader charge as affected by leader extension.

As the initial leader extends itself from the cloud toward ground, charge is withdrawn from zone 1 and transferred to the region about the leader core. FIG. 3 shows the charge on a leader as a function of height above ground, and the voltage on its core so obtained. FIG. 4 shows the results of considering the leader and cloud in combination, including the situations at the end of the first stroke and the beginning of the next. It is interesting to note that while FIG. 3 shows the leader charge to increase as earth is approached, the decreasing voltage causes the charge per unit length to be nearly constant.

Table I summarizes the quantities applying to the studied case.

TABLE I.—SUMMARY OF QUANTITIES APPLYING TO THE BASIC CASE

| | |
|---|---|
| Polarity of cloud | Negative. |
| Height of cloud base | 4 kilometers. |
| Total initial cloud charge | 20 coulombs. |
| Initial cloud voltage to ground | $125 \times 10^6$ volts. |
| Total charge lowered by initial leader | 4.8 coulombs. |
| Mean charge per lineal meter of leader | 0.0012 coulomb.* |
| Mean capacitance per lineal meter of leader | $12 \times 10^{-2}$ farads.* |
| Voltage to ground of leader before contact | $80 \times 10^6$ volts. |
| Average current from cloud to leader | 480 amperes. |
| Electric gradient at earth's surface due to cloud | 320 volts./cm. |

* Varies with voltage and height above ground.

2. RESUME OF BOYS CAMERA DATA

The material in this section is believed to be a correct though perforce over-simplified summary of the data presented by Schonland and others.

Figure 5:
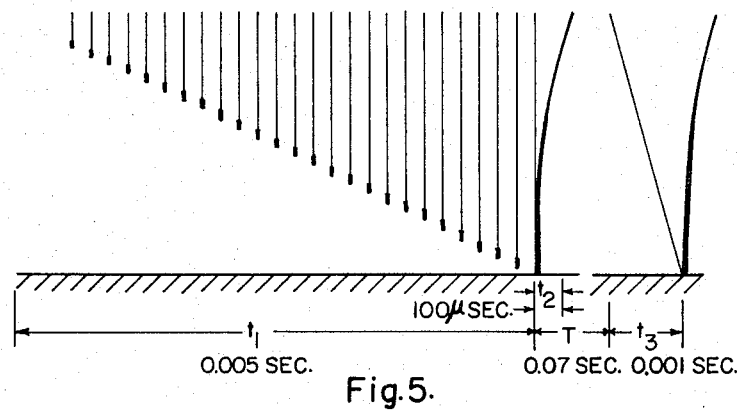
FIG. 5 illustrates diagrammatically a simplified typical Boys camera photograph.

FIG. 5 is a reproduction of idealized Boys camera photographic sequences of two successive strokes from the same cloud. It is representative of the luminosity traces that would be obtained if the photographic film were moving from right to left at high speed when an unbranched, linear vertical stroke proceeds from cloud to earth. The time interval $t_1$ is the period during which the initial "stepped leader" is progressing from cloud to ground. The time interval $t_2$ is the time for the return stroke to reach the cloud. The width of the lines is a rough indication of the duration of intense luminosity, which is about 10 $\mu$sec. (microseconds) near the earth. T is the most frequent interval between strokes; $t_3$ is the most frequent time required for subsequent (to the first) leaders. It is important to bear in mind that FIG. 5 portrays intensity of luminosity only, and that one is not entitled to assume that luminosity is necessarily an indication of current magnitude. The pilot leader and the "bright step" are drawn as vertical lines to indicate that Schonland and his associates had insufficient resolving power to determine whether the luminosity traces travel upward or downward.

Table II is an approximate summary of model values from Schonland's observations concerning the phenomena of FIG. 5, where c is the velocity of light.

TABLE II.—SUMMARY OF BOYS CAMERA DATA
[c=velocity of light]

| | |
|---|---|
| Average rate of progression of stepped leader | 0.0013 c. |
| Average rate of progression of subsequent leaders | 0.0067 c. |
| Velocity of pilot leader, more than | 0.17 c. |
| Mean length of dart in pilot leader | 54 meters. |
| Velocity of bright step, more than | 0.17 c. |
| Duration of bright step, less than | 1 $\mu$sec. |
| Average length of bright step-initial leader | 20 meters. |
| Velocity of return stroke, lower end | 0.33 c. |
| Velocity of return stroke, upper end | 0.1 c. |
| Duration of intense luminosity, lower end return stroke | 5–10 $\mu$sec. |
| Average pause time between steps | 50 $\mu$sec. |

The summary of Table II should be taken with reservation since it is given out of context. Observed values varied widely and it cannot necessarily be assumed that an average for one quantity may be associated with the average of another. As an example, the mean length of a "dart" in the pilot leader is given as 54 meters. Progressive Lightning, B. F. J. Schonland, H. Collens. (Proceedings, Royal Society of London, London, England, vol. 143, 1934.) When associated with the pilot leader velocity of 0.17 c., a dart luminosity duration of less than 1 $\mu$sec. results. In this particular instance, the simultaneous use of two averages seems to be warranted since the bright step itself is stated to have a duration less than 1 $\mu$sec.

3. RESUME OF LABORATORY SPARK DATA

Ryan and Henline first introduced the concept of the formation of a corona envelope around electrically energized conductors in 1924.

Skilling and Dykes (AIEE Transactions, vol. 56, July 1937, pp. 850–57) made the following observations regarding electric gradients in air:

"1. There is a critical electric gradient for air that cannot be exceeded. Any attempt to increase the gradient above the critical value results in profuse ionization of the air, and the charges liberated by ionization take up such positions in space that the gradient is maintained at (or below) the critical value.

"2. Shortly after its formation space charge becomes relatively immobile. This is doubtless due to the formation of relatively heavy ions, for which the mobility is almost negligible as compared to electrons.

"3. The supply of space charge to the region about a conductor commences when the critical gradient is reached, and continues as long thereafter as the applied voltage continues to increase. During this time there is a loss of energy from the conductor . . ."

Much work confirms these observations, and give elaborations of many details. The tests cover point-to-plane, sphere-to-plane, and concentric-conductor configurations, with a rapidly rising voltage applied between electrodes. Data were taken by photographs, cathode-ray current-time oscillograms, and in some instances, by cathode-ray luminosity-time oscillograms. The following is my interpretation of the reported results for the situation of the small electrode being of negative polarity:

(1) A corona burst emanates from the small electrode shortly after the critical gradient of 30,000 volts per cm. is exceeded.

(2) The corona burst is diffused and weakly luminous.

(3) The corona burst may or may not photographically bridge the gap to the opposite electrode, depending upon whether or not a flashover takes place eventually.

(4) The corona burst does not conductively bridge the gap between opposite electrodes, even when it does so photographically.

(5) The corona burst involves a fairly high maximum current density at the small electrode, being measurable in amperes per square centimeter of electrode area at surface gradients only moderately exceeding critical, but dependent upon the rate of rise of voltage.

(6) The corona burst phenomena are rapid. Park and Cones (Journal of Research, National Bureau of Standards, Washington, D.C., vol. 56, 1956) show photographic velocities up to 10 meters per $\mu$sec. and current-time curves cresting at 0.008 $\mu$sec. for gaps of the order of 15 cm.

(7) If flashover is to occur eventually, moderately luminous photographic tracks develop from the large electrode (anode) into the region occupied by the corona burst. These photographic tracks have been termed space stems and plasma channels, the latter term being used herein.

(8) One plasma channel eventually dominates and progresses to the small electrode, or to a similar channel developing from the small electrode.

(9) The joining of plasma channels between the two electrodes constitutes conductive bridging of the entire gap, or flashover.

(10) Junction of plasma channels between electrodes is accompanied by a great increase of photographic brilliance in the track. The brilliance of the track following junction is a function of the circuit constants and amount of energy available from the source.

(11) The growth and junction of the plasma channels requires a much greater time than the formation of the corona burst. Park and Cones show ratios of time from 10 to 1 to 80 to 1. The maximum rate of growth of plasma channel shown by them is 0.4 meter per $\mu$sec.

(12) The physical mechanism of the corona burst has not yet been adequately explained, although the explanation of Park and Cones appears plausible.

4. LEADER HEAD ELECTROSTATICS

Most investigators of lightning phenomena accept the concept of a corona envelope surrounding the leader core at locations other than its lowermost tip. It is my belief that the tip also is surrounded by a corona envelope, but that a new stepping mechanism must first be conceived in order to admit its existence. That mechanism is described in the following section while this section is devoted to the determination of some of the properties of the leader tip.

According to Skilling and Dykes' first observation, the leader core, if stationary, must be surrounded by space charge having such boundaries that the gradient is maintained a critical value. The boundary around the core is roughly cylindrical at locations remote from the tip but has irregularities from the cylindrical shape. The boundary of the space charge around the tip is more difficult of determination.

As a first approximation, the space charge boundary earthward of the tip, might be considered as hemispherical, with the same radius of curvature as that of the cylinder. However, it will be found that this configuration causes the gradients at both the leader-core tip and the hemispherical envelope to greatly exceed critical. Trial and error explorations indicated that the form of the corona envelope earthward of the leader core is probably the pestle-shaped figure of revolution shown by the full lines of FIG. 6. This figure is henceforth termed the "leader head." The only dimension calculable with reasonable effort is the maximum radius R. The relations for determining R, and approximations for determining the capacitance to ground, charge, and gradients as functions of voltage and height, are given in Appendix III of my AIEE Paper 58-829 "The Prestrike Theory and Other Effects in the Lightning Stroke." That treatment considers all of the space charge to be located at the boundary of the corona envelope, for simplicity. It seems likely that some charge will be strewn within the envelope, but preliminary explorations indicate that the simpler assumption is satisfactory to a first approximation.

Figure 7:
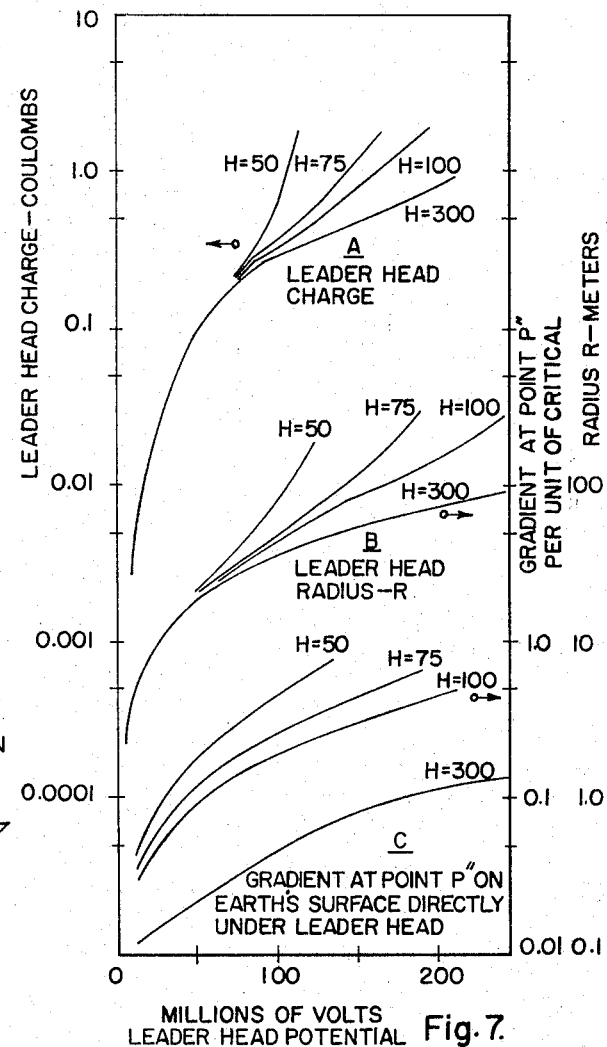
FIG. 7 illustrates graphically leader-head conditions and voltage gradient as affected by leader voltage and height.

Calculations based on a critical voltage of 30,000 volts per cm. were carried out and the results are given by the curves of FIG. 7. These curves are presented in illustration of the interrelation of parameters, and as numerical approximations of the quantities themselves. It is likely that for heights under 100 meters, and potentials above $100 \times 10^6$ volts, instabilities will prevent the leader head from reaching the sizes shown.

The "A" group of curves is of considerable interest in that the charge content of the leader head is shown to rise very rapidly with voltage and proximity to the earth.

5. LEADER-HEAD DYNAMICS

The curves of FIG. 7 show theoretical diameters of the leader head as functions of voltage and height above ground. No consideration was given as to the manner by which the leader head might progress from one location to a lower one. As the leader-head voltage is increased by the addition of charge, it would appear possible, theoretically at least, for the head merely to increase in size without progressing toward the earth. However, such a process must stop eventually because the leader-head potential could never exceed the potential of the cloud itself. Therefore, the manner of development of the corona burst which constitutes the leader head must be examined.

An artificial starting point is desirable in evolving a theory of corona-burst development. Assume a metal sphere of radius R to be suspended 300 meters above the earth's surface and rapidly charged to $80 \times 10^6$ volts to earth. The electric gradient at its lower surface may be calculated by Equation 4, Appendix III of the aforesaid Griscom Paper 58-829. The results for a few selected radii are given in Table III.

TABLE III.—ELECTRIC GRADIENT AT THE UNDER SURFACE OF A METAL SPHERE 300 METERS ABOVE EARTH AND CHARGED TO $80 \times 10^6$ VOLTS

| Sphere Radius R, meters | Electric Gradient, volts per meter | Ratio Actual Gradient / Critical Gradient = $G/G_b$ |
|---|---|---|
| 1 | $80.3 \times 10^6$ | 26.6 |
| 5 | $16.2 \times 10^6$ | 5.4 |
| 10 | $8.1 \times 10^6$ | 2.7 |
| 20 | $4.2 \times 10^6$ | 1.4 |
| 28 | $3.0 \times 10^6$ | 1.0 |

Figure 6:
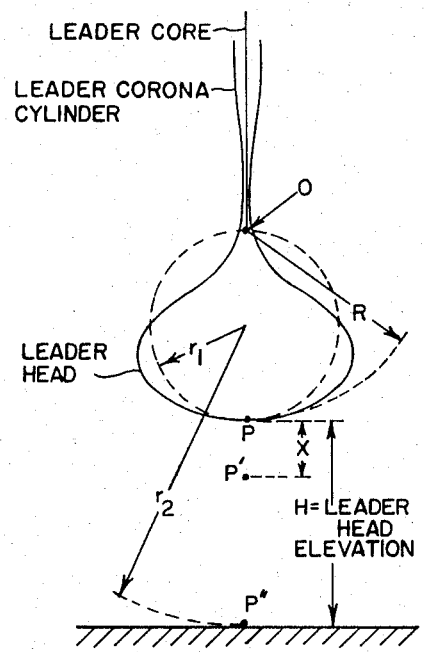
FIG. 6 illustrates diagrammatically the leader-head contour and dimensions used for calculation.

It is inferred that the radius of curvature R, FIG. 6, of the leader head corona burst is similarly defined by Equation 4 of the aforesaid Appendix III. Also, for a given voltage on the leader core tip, the envelope of the corona burst will expand until the gradient at its under surface drops down to critical. It seems reasonable to suppose that the rate of expansion of the corona envelope is some function of the gradient ratio $G/G_0$. Comparatively little data are available on the rate at which charge may be propagated into space, as a function of $G/G_0$. The minimum rate is known with some certainty to be in the vicinity of 0.1 meter per $\mu$sec. for $G/G_0 = 1.0$, this being set by the minimum velocity at which electrons can move in air and create an equal number of fresh electrons by ionizing collisions. Park and Cones measured average velocities of 5 to 10 meters per $\mu$sec. where $G/G_0$ was about 5 at the electrode. Saxe and Meek (Proceedings, Institution of Electrical Engineers, vol. 102, pt. C, 1955) cite velocities in excess of 2 meters per $\mu$sec. with $G/G_0$ exceeding 1.0 by an unknown amount. An upper limit of velocity close to the speed of light may be envisioned as $G/G_0$ approaches infinity.

This meager data may be used to construct the tentative propagation velocity curve, FIG. 8B. Its probable validity and the curves, FIGS. 8A and 8C will be discussed later.

Figures 9A, 9B:
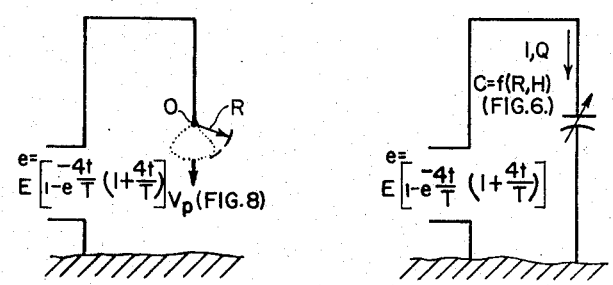
FIGS. 9A and 9B illustrate, respectively, pictorial and electrical circuits used to calculate corona burst.

With a propagation velocity relationship, it is possible to examine the formation of a leader head on a dynamic basis, upon the application of a voltage. FIG. 9A shows the electric circuit pictorially, with the leader-core tip located at 0. The envelope of the leader head at a given instant is shown by the dotted outline. The radius R and the propagation velocity are shown for the same instant. The electric circuit is shown in FIG. 9B the capacitance C being variable with time as is the applied voltage $e$.

Figure 8:
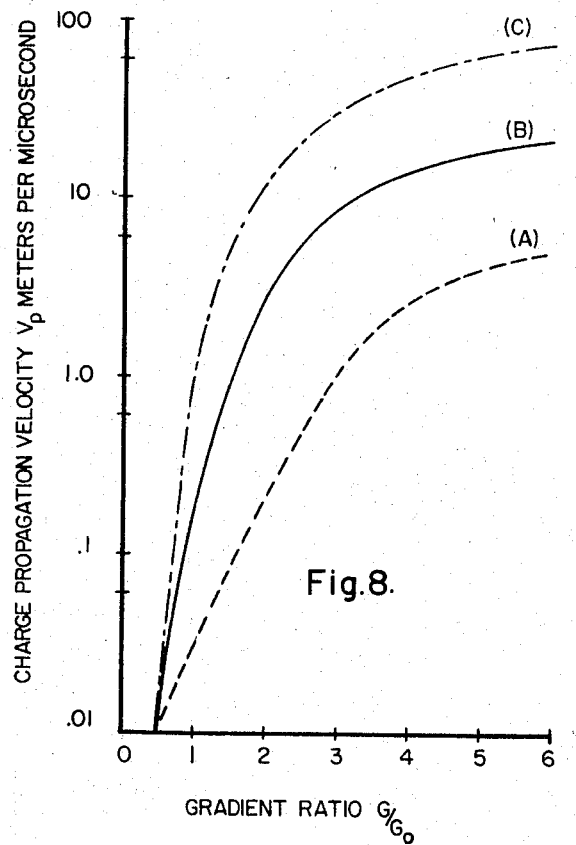
FIG. 8 illustrates corona-burst propagation velocity characteristics used in calculations.

The circumstances of the circuit of FIG. 9B are governed by the following equations:

$e = E(t)$, a chosen function
$G/G_o(R)$ from Equation 4, Appendix III of paper 58-829
$C(R,H)$ from Equation 6, same paper
$Q = C(e - 3 \times 10^5 R) + 6 \times 10^{-6} R^2$
$V_p(G/G_o)$ from FIG. 8
$V_p = dR/dt$
$i = dQ/dt$
$W = \int e i \, dt$ The form of the equation for Q gives recognition to some charge being strewn in the region between the leader-core tip and the corona envelope. Its form and coefficients were empirically determined. The expression for current should include the term $C(de/dt)$, but this was found negligible compared to $dQ/dt$.

Equations 1 are best solved by the use of digital computers. However, longhand step-by-step calculations are not too tedious, the first computations being so made. The results of a selected sample computation are shown in FIG. 10. The conditions of the problem were as follows:

$e = 80 \times 10^6 [1 - e^{-4 \times 10^6 t}(1 + 4 \times 10^6 t)]$
$H = 300$ meters
$V_p(G/G_o)$ from curve B of FIG. 8

FIG. 10 shows a crest current of about 50,000 amperes, reached in 0.6 μsec., at which time the distance R of the corona envelope from the leader-core is 7 meters. In 3 μsec. the current has dropped to less than 7,000 amperes.

In 30 μsec., $G/G_o$ has dropped to 1.0, and further propagation of charge should presumably cease, because electron velocities would be too low to create new electrons by collision. There are several objections to stopping the analysis at this point: (1) None of the curves have become asymptotic, and the current-time curve would need to go to zero abruptly. Mathematically, such discontinuities are incongruous. They could be avoided by redrawing the curve of $V_p$ versus $G/G_o$ so that its initial slope is zero. This, however, would conflict with all theories of air breakdown, which consider an abrupt discontinuity to occur when the critical gradient is passed through. (2) Mathematical determinations of gradients neglect the random effects that are inevitable in ionization phenomena. Essentially, the gradients so obtained are averages, and it should be expected that local gradients will vary both directions from the average. (3) Study of test results shows continuing charge displacement after the applied voltage crests, further indicating local gradients exceeding critical. (4) The average current density at the surface of the corona envelope becomes quite small at the critical gradient, being shown as 10 amperes per square meter (1 milliampere per cm.$^2$). It is doubtful that such low current densities would be self-sustaining, and it is more likely that much higher current densities prevail at spot localities, the sum total of which yield the low average density.

The foregoing is given in explanation of why the curves of FIG. 8 show charge propagation rates less than the "minimum," and also why the leader-head in a later discussion is considered to develop irregularities of contour.

The curve of energy versus time is of considerable interest, showing that nearly half of the energy involved up to 50 μsec. is transferred to 2 μsec.

FIG. 11 shows the current-time relations of a leader-head corona burst for the problem of FIG. 10, using various combinations of propagation velocity curves and times to crest voltage. In the figure, the numbers represent the time in microseconds to reach 90% of the full potential of $80 \times 10^6$ volts. The letter shows which propagation curve of FIG. 8 was used. These data are included to show the influence of the two factors on the crest current, and time to crest. The 1-B curve is that of FIG. 10.

The theory given in this section was tested against the best data which have come to hand, that of Park and Cones (Journal of Research, National Bureau of Standards, Washington, D.C., vol. 56, 1956). FIG. 12A shows a replot of their Fig. 6-F, with maximum current amplitude taken from their Fig. 9. FIGS. 12B, C and D show the results of digital computer studies, as labeled. The computer used exactly the same program routine as used for FIG. 10, except: (1) the voltage function and dimensions were set in to represent those used in the test, and (2) for FIG. 12C a time delay was introduced to simulate formative delay for the corona burst. It should be particularly noted that the FIG. 8B propagation velocity curve was used. This was the one derived from physical data.

It is considered that the comparisons shown by FIG. 12 confirm the general validity of the dynamic theory of the corona burst. The limitations on the comparison of theoretical and test results will be appreciated by considering the following observations lifted from Park and Cones' paper:

(1) The applied voltage would, at times, flash over a 20-cm. gap.

(2) The maximum amplitude of the corona burst current for a 13-cm. gap ranged in the tests from 9 to 29 amperes, evidently because of variations in formative delays.

(3) The time to flashover for a 13-cm. gap ranged from 1.3 to 6.2 sec. (Note that both FIGS. 12B and C indicated flashover at 1.5 μsec. for an 18-cm. gap.)

It is felt that with a greater volume of test data, elaborations can be made in the theory to bring about closer agreements. It may be noted that the theory does not include a substantial loss item, and such inclusion would improve the correlation.

6. THE INITIAL STEP LEADER MECHANISM

Figure 13A:
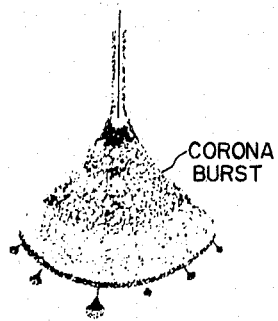

A concept of the state of affairs near the end of the process just described is illustrated in FIG. 13A. This will be taken as a starting point for the description of the initial leader-stepping mechanism. This diagram is intended to depict a vertical cross section of the leader head, the specks illustrating negative space charge. The space charge has been indicated as having a volumetric density falling off with distance from the leader core tip, but again concentrating at its outer boundary. The outer (lower) boundary at 50 μsec. is, according to FIG. 10, 28 meters from the leader tip. It has protruding irregularities in its contour, the sum total effect of which gives the average gradient ratio $G/G_o$ of 0.9 shown in FIG. 10 at 50 μsec. It may be expected that some one of the protuberances will have outrun the electrostatic shielding of the main body so that the gradient at its outward surface exceeds critical, urging a further advance. A local gradient is thereby set up between the protuberance and the leader head, and fresh charge is drawn into the protuberance from the main body. The path through which the charges pass would, by use, gradually become thermally ionized into a plasma channel of good conductivity, as discussed in section 3.

Figure 13B:
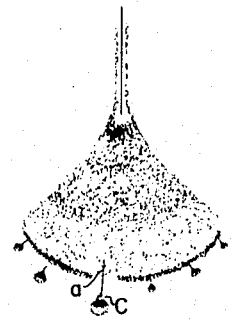

FIG. 13B shows a later stage in the process of the plasma channel penetrating and gathering charge from the leader head for transport to the protruding ionization front. The inward tip "a" may be termed a virtual anode, and the outward tip "c" a virtual cathode, these terms giving recognition to their ultimate functions, and the fact of their locations in free space.

Figure 13C:
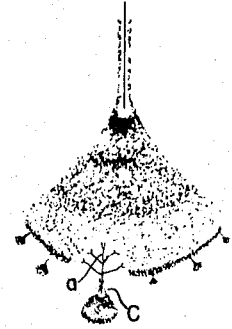
Figure 13D:
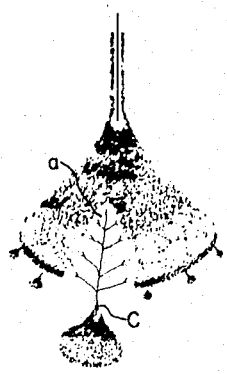
Figure 13E:
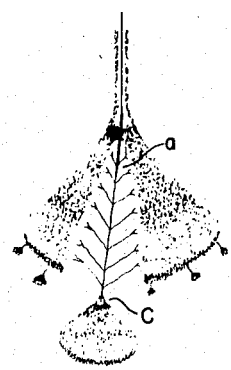

FIGS. 13C, D and E are conceptions of later stages of the same process. In FIG. 13E the virtual anode has met the leader-core and the current fed into the plasma channel from the leader head is augmented by current from the core. This is depicted by showing the paths by heavier lines, more so for the new plasma channel because it has become heavily conducting for the first time.

Figure 13F:
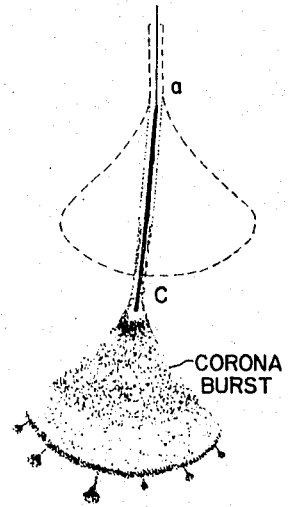

FIG. 13F shows the concept of the completion of one cycle of the step mechanism. Here the path between a and c is shown as a heavy line to indicate that it is the bright tip of the step process. This path length is about 28 meters for the case studied, which is in good agreement with the observed average length of 20 meters increasing as the earth is approached.

A correlation with the voltage function used for the problem of FIG. 10 may now be attempted. For FIG. 10, the voltage function started at zero, rose very slowly at first, and then rose increasingly fast to about 90% of its ultimate crest. In the actual situation, the leader-head and core change in potential but little. However, consideration of the sequential growth of the protuberance from c shown in FIG. 13 will reveal that its growth factors vary in a similar manner. For example, in FIGS. 13A and B, if the gradient in front of the protuberance were to be studied by flux mapping procedures, it would be found comparatively low, which would correspond to a low-voltage application if the protuberance stood alone. From stage of FIG. 13C on, however, the front of the protuberance is sufficiently in advance of the leader head that the gradient is essentially determined by its own contour, at nearly full voltage. The selected rise time of 1 $\mu$sec. for the applied voltage is justified on the basis that this is the most frequent duration of the bright step.

In FIG. 10, the displaced charge and leader head radius are indicated as continuing for 100 or more $\mu$sec., although most of the total charge displacement takes place in about 10 $\mu$sec. It is probable that the formation of plasma channels starts at about that time, and the final stages of growth of one leader head, and the starting stages of the succeeding one, proceed simultaneously.

Branching

With many irregularities in the contour of the leader-head space charge, it would appear to be a matter of chance whether one, or several widely separated large protuberances might not develop simultaneously. In that event, the forked plasma channels could be expected to develop into arc channels, constituting branching. The branching would originate at the tip of the old leader core, this coinciding with photographic observations.

7. THE PRESTRIKE

If the earth's surface were perfectly level, with no projecting objects, the leader-head would progress all the way to earth, without inducing any prior discharges from the earth. This is because the radius of curvature of the lower surface of the leaderhead is very small compared to that of the earth, and its average surface gradient is just critical.

For the cases of interest here, transmission towers and lines, their heights and curvature radii cause the critical air gradient to be exceeded while the leader head is still quite remote. The configurations are far too complicated to permit numerical exploration. In the diagrams of FIG. 14, a leader head charged to $80 \times 10^6$ volts is coaxially approaching a 50-meter-high tower. Alongside the tower is a 10-meter-high grounded metal pole. The sequence of FIGS. 14A, B, C, D represents the last few steps of the leader. An attempt was made to estimate the extents of the corona envelopes from the tower and the pole which would result in critical gradient, but the proportions shown should be considered as illustrative only.

In the stage of FIG. 14A, the gradient around the upper structural members of the tower is considered to have been previously exceeded so greatly that a corona burst has been projected upward, and has assumed an outline where the average gradient is just critical. In the stage of FIG. 14B, the leader-head has become closer, requiring projection of additional charge to a greater distance, to maintain the average gradient at critical. The process continues through FIG. 14C to FIG. 14D, the last possible before junction. The stages of FIGS. 14A to D are separated by the most frequently observed time intervals of 50 $\mu$sec. and distance intervals of 20 meters.

The sequence FIGS. 14E, F, G shows the concept of the prestrike mechanism. At FIG. 14E, the leader-head contour has become unstable and charge is being withdrawn from the main body and transferred to a locally protruding charge front, as in the stepping mechanism. A similar protuberance is induced from the tower-head space charge. The process can be expected to be rapidly cumulative, as pictured in FIGS. 14E and F leading to the junctures of the plasma channels and the formation of a conducting arc as shown at FIG. 14G.

The time interval required for the stages FIGS. 14D, E, G is probably shorter than the step interval, inasmuch as nonuniformities of both the leader head and tower head are involved. Also, the tower top is a real anode and therefore able to supply additional neutralizing charge at a rapid rate. As indicated in FIG. 14F, it is surmised that longitudinal plasma channels will form simultaneously in several locations, joining one another until the last air gap is closed. Some current will flow in the tower prior to the stage of FIG. 14G due to alterations in the electric fields, but the main event is the prestrike, the dumping of charge from the leader-head into the tower.

Factors determining prestrike current and waveform

FIG. 15A is FIG. 14F redrawn for the purpose of devising an electric circuit for analysis. The "$a$" capacitances are those in which the stored energy of the leader-head originally resided. $D_1$ is the main plasma channel extended from the leader head and connected to the network of plasma channels within the head. $d$ is the capacitance of $D_1$ to ground (including surrounding space charge). Part of the original leader head charge has been withdrawn onto the conducting system of $D_1$. The $b$ capacitances are those between the conducting system of $D_1$ and the remaining space charge of the leader head.

As $D_1$ extends, there is a continual redistribution of energy stored in the $a$, $b$, and $d$ capacitances. The numerical values of the capacitances also change as $D_1$ extends, the $b$ and $d$ capacitances rising rapidly, the "$a$" capacitances reducing but slightly, which causes $E_H$ and $E_1$ to become less. Part of the charge on the conducting system of $D_1$ consists of residing electrons, and part by electric induction around the closed circuit of the $a$, $b$, and $d$ capacitances.

The physical layout of FIG. 15A furnishes the basis for the electric circuit of FIG. 15B. $D_1$ is shown as a surge impedance, but its capacitance to ground is recognized as affecting the voltage relations around the loop $C_a$–$C_b$–$C_d$. The extending plasma channel from the tower, $D_2$ is similarly shown as a surge impedance. Switch S, when closed, signifies the junction of the plasma channels. $Z_T$ and $Z_{GW}$ are the surge impedance of the tower and ground-wire system, respectively. The electric circuit of FIG. 15B can be solved by traveling-wave theory.

There are large factors of uncertainty about all of the circuit elements of FIG. 15B, particularly those other than $Z_T$ and $Z_{GW}$. However, it is perhaps not too important that the circuit constants be known with high accuracy, since the leader head potential is widely variable from stroke to stroke and its charge varies approximately as the square of the voltage (see FIG. 7).

By the same token, it is not important that the proportion of trapped charge on $D_1$ and its associated plasma channel system be examined in detail. Rough explorations indicate that the order of three-fourths of the original leader head charge is instantly available through $C_a$ and $C_b$ in series. The rest of the charge is not available until the plasma channels grow into the remnant volume of the space charge, which may be expected to take several microseconds.

One further aspect of the circuit of FIG. 15 must be considered. The plasma channels $D_1$ and $D_2$ carry only moderate currents before they join, and they probably do not become good conductors immediately upon junctions. Wagner and Hileman (AIEE Transactions, vol. 77, pt. III, June 1958, pp. 229–42) suggest that the effect of the transition from spark to arc may be represented by an inductance. From their tests, they deduce the equivalent inductance to be about $2.9 \times 10^{-6}$ henrys per meter of lineal arc. If this inductance is distributed, as assumed by them, only the velocity of propagation and surge impedance will be affected when analyzing the circuit of FIG. 15B, and a rapid rate of rise of current will ensue when switch S is closed. A compromise may be made by inserting a lumped series inductance arbitrarily based on one half the sum of the lengths of the two plasma channels $D_1$ and $D_2$. If they total 40 meters, the inductance so obtained is $58 \times 10^{-6}$ henrys. Then, considering the surge impedances $Z_1$ and $Z_2$ as resistances of 400 ohms in series, the initial slope of the current-time curve becomes $L/R = 58 \times 10^{-6}/800 = 0.07$ μsec. About the most that can be obtained from this calculation is that a rapid rate of rise of current is probable.

Even if the spark-arc inductance is an applicable concept, the inductance is not a permanent circuit element. Consequently, the circuit of FIG. 15B was solved in the form shown. The method of analysis and more complete results are given in AIEE Paper 58–782 paper. FIG. 16 is taken from the aforesaid Paper 58–782 and is based on the following conditions:

Leader-head potential: $75 \times 10^6$ volts
Leader-head charge: 0.13 coulomb
$Z_1$ channel length: 30 meters
$Z_2$ channel length: 20 meters
Surge impedance of $Z_1$ and $Z_2$: 350 ohms
Tower height: 50 meters
Tower surge impedance: 130 ohms
Ground-wire surge impedance: 200 ohms It will be noted that for large leader-head charges, the tower-top potentials are entirely different in character from those indicated by the AIEE method when conventional stroke characteristics are used.

*Prestrikes to ground wires*

FIG. 17 shows a side elevation of a transmission line. At left, a leader-head is coaxially approaching a tower. This is the same situation shown on FIG. 14. Consideration of the situation longitudinally of the line indicates the necessity of further examining the contour of the tower head space charge. This was indicated as contained in a single envelope on FIG. 14. It appears unlikely that a single envelope of space charge upward of the tower could shield the ground wires (and line conductors) sufficiently that the electric gradient would remain below critical. Also, it is not clear whether the space charge about the conductors would be smoothly distributed or in concentrations as indicated to the right and left of the tower respectively on FIG. 14A. Arguments can be developed in support of both distributions. The uneven distribution is favored on the basis that upward plumes probably will have been formed by electric induction from the cloud before launching of the leader. Development of the space charge envelope would then be from the plumes and not from the ground wire. The discharge of the leader head may be expected similar to that shown on FIG. 14.

The sudden dissipation of leader head charge leaves any space charges of opposite sign without electric inductive support. They must, therefore, fall back into the conductive system from which they were originally drawn, by formation of plasma channels. This is illustrated for the steel pole on FIGS. 14E, F and G. The lateral channels would have low luminosities compared to the longitudinal channel, giving a photographic appearance of a central strongly luminescent upward spike as indicated at FIG. 14G.

8. THE RETURN STROKE

The prestrike as decribed in the previous section only withdrew that part of the initial electrostatic energy of the leader head as was immediately available. Part of the initial energy (estimated at one-fourth) remains as remnant space charge around the network of plasma channels and these are now in conductive connection with the earth. If the plasma channels grow at the rate of 1 meter per microsecond (see item 11, section 3), then perhaps 5 to 15 μsec. will be required to neutralize the remnant leader-head charge. This probably is manifested by an exponentially decaying current.

Simultaneously, redistribution of charge and electrostatic fields about the leader channel will have been taking place. FIG. 18A is an attempted portrayal of the situation shortly after the prestrike, wherein the remnant space charge is omitted for simplicity. With this physical picture, the following effects may be expected:

(1) Most of the electrostatic energy of the lowermost portion of the leader channel resides in the electric field between it and the stroke channel. Therefore the current generated by charge neutralization does not flow to earth, but around a locally closed loop which is moving upward.

(2) The electric gradient in the region between the leader space charge and the stroke channel will be exceedingly high. Therefore, the thermal loss and luminosity in the region of the upward tip of the stroke channel will be very high.

Boys camera data (see section 2) show the intense luminosity to move upward at an initial rate about one-third that of light. This, in conjunction with the charge distribution, specifies the charge neutralization rate, and current. For the studied example, the charge per meter is from Table I, 0.0012 coulomb. With a channel neutralization velocity of 300/3 meters per μsec., the current is $(100 \times 0.0012)/10^{-6}$ or 120,000 amperes This current flows in the stroke channel, but according to item 1, not much of it initially flows to ground.

The extreme gradient condition of FIG. 18A is not likely to persist long. FIG. 19 shows a conception of the lateral plasma channel tracery formed from the leader core into the leader space charge. (Vertical and horizontal dimensions to different scales for clarity.) In the vicinity of FIG. 19A, the capacitance from leader core to ground per unit length is much lower than at FIG. 19C hence the velocity $V_2$ at which the tip progresses upward can be expected to be faster than $V_1$, the velocity of the lowermost part. Accordingly, at a later time instant, the physical configuration can be expected to resemble that shown by FIG. 18B, the profile of the leader core voltage having considerable slope.

As a consequence, fewer of the lines of electric force from the space charge terminate on the stroke channel, most of them terminating on the earth. Therefore, the neutralized charge results in a current flow to earth. Observationally it is known that the trace of luminosity velocity lessens as it travels upward. The rate of charge neutralization accordingly becomes less as time advances, causing the tail of the current-time wave to drop, as shown by the upper curve on FIG. 20.

The combination of the effects just discussed leads to the current-time wave of the shape shown by the lower curve of FIG. 20. The time to crest cannot be deduced from present knowledge of the physical or electric circuit properties. However, it may be inferred that since the earlier stages of the return stroke involve high luminosities, they also involve high losses, and that the duration of intense luminosity is a measure of the duration of high loss. This line of reasoning leads to the further conclusion that the duration of luminosity is also the time required to reach crest current. This time (see section 2) is 5 to 10 μsec.

9. SUBSEQUENT LEADERS

Leaders subsequent to the initial have been observed as usually not stepping or branching, although occasionally they step in the latter part of their earthward progress. An explanation of these facts is offered in this section.

Immediately following the return stroke, the leader core is in a state of fairly good conductivity at a low potential with respect to ground, not surrounded by a significant amount of space charge, and in conductive connection with a plasma channel system within the cloud. It can therefore accept current from the cloud at whatever rate the cloud can supply it. Evidently this rate is not exceptionally high, else the remaining cloud charge would rapidly be drained.

Based on the example of section 1, and the average velocity of subsequent leaders, as given in Sect. 2, the cloud delivers an average current of $$(300 \times 0.0067 \times 0.0012)/10^{-6} = 1,667$$

amperes to the average subsequent leader. It is likely that about the same current was delivered to the initial leader, for while the calculated current was 480 amperes, branching and losses would greatly increase the current.

If the typical cloud can deliver a continuing current of only 1,667 amperes to a subsequent leader, and that current just equals the current required to re-establish space charge around the leader-core, then the current in the leader-core earthward of its new advancing tip must be zero. In that event, the voltage drop earthward of the tip per unit of length would become extremely high permitting the cloud to regain a high fraction of its initial potential, as shown following the dashed transition of FIG. 4. This increase in cloud potential makes consistent the assumption of the relaying of space charge by the subsequent leader, and its consequent current demand.

The transition of the stroke arc channel from a good conductor to a broken conductor is not too hard to rationalize. There must always be some ohmic voltage drop from cloud to ground, hence there will be a corona loss current. Therefore, the current in the channel will taper, being highest at the cloud end. An instability sets in wherein the voltage drop in the leader core per unit length becomes higher at the earthward portions, and lower at the upper portions. This accentuates the earthward tapering until nearly complete severance of the conducting path may be expected. At this time the cloud charge, as available, is almost entirely utilized in recharging the stroke path as described.

If the continuing current from the cloud is unusually high a long time may be required for the leader core conductivity to be broken. This would account for the long-duration low-current tails observed for some strokes ("hot lightning").

The circumstances which resulted in stepping of the initial leader are absent for the subsequent leader, at least for the major portion of its course. Its central channel, the leader core, is in a moderately good conducting state, as contrasted with the initial leader which must penetrate virgin air. The situation may be pictured as similar to an inversion of FIG. 19, wherein the longitudnially tapering voltage front will not result in extreme electric gradients at the advancing leader core tip, and a leader head is not formed.

So long as the leader core at a given location has retained good conductivity, a continuous advancement of the subsequent leader is probable. But the channel conductivity reduces with lapse of time, and if it becomes poor enough, steady progression becomes impossible and the stepping mechanism resumes. This is most apt to happen at locations close to earth as these have the greatest age.

The foregoing explanation of subsequent leaders is consistent with Schonland's "dart" simile. As the leader channel is recharged a length of leader core about 50 meters long and trailing the new tip has work done on it (due to fresh reionization) and temporarily becomes luminescent. The velocity of propagation would appear dependent upon both the cloud current and the ionization age of the leader core.

10. CORRELATION OF LEADER MECHANISM WITH BOYS CAMERA PHOTOGRAPHS

Initial leaders

The leader-head charge is seen from FIG. 10 to be in the vicinity of 0.1 coulomb at the 50-$\mu$sec. time point at which time, on the average, the new step will take place. The new leader head will presumably have about the same charge, but the leader channel, being extended 20 meters farther, requires 0.024 coulomb additional. In the short space of about 1 $\mu$sec. occupied in foregoing the new step, the only source for that new charge is the existing leader. It may therefore be expected that simultaneously with the current pulse of FIG. 10, a similarly shaped pulse but of crest amplitude=(0.024/0.1) 50,000=12,000 amperes will be drawn from the leader core. (Losses are neglected here, as with previous numerical examples.) This will travel up the leader core channel as a wave initially about the shape of the current-time wave of FIG. 10, and will produce a luminosity dart of about 0.6-$\mu$sec. duration at first, but gradually lengthening due to retardation effects. (The duration of intense luminosity is assumed about equal to the time to crest of the current, as in section 9.)

This analysis leads to the conclusion that the pilot leader trace and the bright step start simultaneously, and at the same point in space, the former traveling upward, the latter downward. Thus, in FIG. 5, had sufficient time resolving power been available, the junction of the pilot leader and bright step luminosity traces would have shown them to be at an obtuse angle, with the apex to the left.

11. UPWARD DISCHARGES

Gradients on grounded objects

If a grounded sphere of radius R is at a height H above ground in an otherwise uniform electric field $G=E/D$ the electric gradient $G_s$ at its top surface is, to a first approximation, $G_s=(H/R)G$. If $G_s$ be chosen equal to $G_o$, the critical air breakdown, then $R=H(G/G_o)$.

That is, if a grounded sphere is in an otherwise uniform field of relative gradient $(G/G_o)$ per unit of critical, its radius must be approximately its height times the relative gradient to avoid corona. Or, if its actual radius is less than the value so obtained, a corona envelope will extend upward to a distance approximately equal to $H(G/G_o)$. A further liberty may be taken by applying this relation to the curvature radius of the topmost part of any grounded structure whose height is several times its greatest lateral dimension.

Continuing discharges

A pointed electrode in space and undirectionally energized to earth will emit (or collect) a continuing corona discharge and draw a continuing current from the energy source. The same is true for a grounded electrode in a strong electric field. Rather than to describe the corona currents as "small," "moderate," "large" etc., which terms are meaningless, they will be defined by an equation, the test data for which is not available over a sufficient range of parameters to estimate the data's probable accuracy, hence the derivation will not be given. This equation for the current from a grounded point electrode at a height of H meters above earth, in a relative field intensity of $G/G_o$, created by a negatively charged cloud, is $$I=[(G/G_o)H]^2 \times 10^{-2}$$

amperes (do not use when I exceeds 0.5 ampere)

Some illustrative values developed from this equation are given in Table IV.

TABLE IV.—CORONA CURRENT EMITTED BY GROUNDED OBJECTS WHEN INFLUENCED BY A NEGATIVE FIELD 1/100 OF CRITICAL

| Object | Height, meters | Current, amperes |
|---|---|---|
| Blade of grass | 0.05 | $2.5 \times 10^{-9}$ |
| Metal garden stake | 1.0 | $1.0 \times 10^{-6}$ |
| Metal flagpole | 30 | $9.0 \times 10^{-4}$ |
| Empire State Building | 400 | $1.6 \times 10^{-1}$ |

In each instance the object described is to be considered as standing alone on a perfect plane surface, or standing among objects of similar heights, but distant from them by about twice their heights. The relative gradient $G/G_o$ is taken as 1/100 which is approximately that of the typical cloud of section 1.

The sum total of the corona or ion currents from foliage and other irregularities to an overhead charged cloud is considerable, one authority estimating 2 amperes. The space charge so created alters the electric field due to the cloud. Wind conditions can also be expected to affect corona emissions.

The upward leaders from the Empire State Building in New York City demonstrate that when continuing corona discharge currents are large, there is a transition from glow to arc, and that once the arc starts, its upper tip constitutes the electrode. The arc tip progresses upward, increasing the effective height and thereby the current. Glow-arc transition occurs in the broad vicinity of 0.5 ampere, hence caution should be exercised in using the equation.

Burst discharges

In a continuing discharge, the mobility of the emitted space charge probably controls the shape of the corona envelope and hence the current. A leader head approaching ground creates gradients of an entirely different order of magnitude than those produced by the cloud itself, as shown by FIG. 7C.

FIG. 21 is a plot of the approximate relative gradient at the earth's surface coaxially under an approaching leader head charged to $80 \times 10^6$ volts. No discontinuities are shown at step intervals of 20 meters because, except for losses, the step does not result in a change of charge for the system. At 300-meter elevation, the earth gradient is about 0.035 of critical, and many objects in the average landscape would be in corona. The gradient for 100-meter elevation is about 0.16 of critical, and the time for the leader head to travel from 300-meter elevation is about 500 $\mu$sec. The situation with respect to the corona discharge from a given object is seen to be one of dynamics, much the same as described in section 5, since the rate of change of gradient, as well as the gradient, is involved. It can be expected that the corona envelopes from grounded objects will involve bursts of discharge, each time the leader head advances a step. Since the leader head takes less than a microsecond to advance once it starts to do so, the rate of change of induced change will also be large. High current pulses of perhaps hundreds of amperes crest will therefore flow from the grounded objects, unless limited by their conductivities.

It would appear inevitable that before a leader head could contact the earth one or more fair-sized heads of space charge will have sprung up from protruding objects. The contact phenomena would then follow a sequence similar to FIG. 14. Upon discharge of the leader head, any space charge head not directly contacted would no longer be bound and release of its charge would result in heavy current flow to ground. Photographically, only the main discharge channel is likely to be visible as illustrated at the top of the pole alongside the tower of FIG. 14G. This type of phenomenon probably accounts for the short brilliant upward flashes sometimes seen near the stroke proper.

The foregoing investigation lead to the following summary:

(1) A theory of the time and space dynamics of burst corona appears necessary, and is justified within the limits of available data.

(2) The burst corona concepts were used to devise a theory of the physical processes involved in the step-by-step advance of the initial leader.

(3) The combination of items 1 and 2 lead to the conclusion that the head or lowermost portion of the initial leader contains a very large concentration of immediately available energy.

(4) The rapid dumping of the leader head charge precedes the return lightning stroke. It is therefore termed a "prestrike." It results in the delivery of a high-magnitude short-time current pulse into the stricken tower as shown in FIGS. 49 and 50.

(5) The prestrike current flowing into the tower creates high-magnitude short-time voltage spikes at the tower top. It is believed that, with certain ranges of transmission-line design constants, the prestrike current determines the outage rate, rather than the return stroke current. Also, that the phenomenon accounts for the heretofore unexplained high outage rates on some transmission lines.

(6) A return stroke mechanism is suggested, the details of which indicate that the current crest is reached in 5 to 10 $\mu$sec.

(7) The theories are correlated with Boys camera photographic records.

(8) Several types of upward discharges were studied, leading to the development of approximate relations concerning their physical dimensions and current-time functions.

(9) A glossary of terms is given below to clarify their usage in this disclosure.

12. GLOSSARY OF TERMS

*Arc.*—A thermally ionized channel in air, intensely luminous.

*Bright step.*—The new length of leader channel created when an earthward step takes place. Its photographic luminosity is much greater than that of the pilot leader.

*Corona burst.*—A short-duration ($10^{-8}$ to $10^{-5}$ seconds) diffuse discharge from a point source into air space accompanied by crest currents in the range of $10^{-2}$ to $10^5$ amperes, weakly luminous by comparison to the same current-time relations in an arc channel.

*Corona discharge.*—A continuing, diffuse weakly luminous discharge from a point source into air space accompanied by a current flow in the range of $10^{-9}$ to $10^{-1}$ amperes.

*Corona envelope.*—The imaginary surface bounding space charge.

*Critical gradient (of air).*—The electric field intensity at which air will be ionized. Taken here as 30,000 volts per cm. for uniform fields.

*Discharge.*—An electric manifestation in air.

*Gradient ratio.*—The ratio of actual gradient to critical gradient.

*Leader.*—Generally used without physical description, and referring to the weak luminosity trace which precedes the brighter main flash in lightning and impulsive gap flashovers.

*Leader channel.*—The path in space (air) of a leader.

*Leader core.*—The thermally ionized narrow, central conducting portion of a leader.

*Leader corona cylinder (envelope).*—The imaginary surface bounding the space charge which surrounds a leader core.

*Leader head.*—A pestle-shaped volume of space charge at the earthward tip of a leader core. A physically large corona burst.

*Leader, upward.*—A plume from a point source into air space, whose length increases with the lapse of time. Surrounded by a corona discharge. Moderately luminous. Accompanied by a current flow in the range of $10^{-1}$ to $10^3$ amperes.

*Pilot leader.*—The photographic trail along the leader channel between the cloud and the bright step.

*Plasma channel.*—A narrow, moderately conducting path in air, containing ions of both signs. At least one extremity of the channel photographically terminates in air space. A channel penetrating into and in the process of collecting negative space charge for transport to an anode.

*Plume.*—A continuing, narrow, moderately luminous discharge channel from a point source into air space, surrounded by a corona discharge. Its length may range from a fraction of an inch to several feet. Accompanied by current flow in the range of $10^{-6}$ to $10^{-2}$ amperes.

*Prestrike.*—The phenomena occurring when the leader head contacts a grounded object, and preceding the return stroke.

*Return stroke.*—Generally, the current-time pulse from ground in neutralization of the space charge laid down by a leader. The brightly luminous path of a single component of a lightning stroke.

*Space charge.*—A volume of space occupied by an excess of ions of one kind. The kind of ions, location, physical dimensions, and volumetric density of the charge should be identified when possible.

*Spark.*—The first filamentary brightly luminous track which fully joins two electrodes of opposite polarity.

*Stepped leader (initial leader).*—A leader which progresses earthward by steps.

*Subsequent leader (dart leader).*—A leader subsequent to the first, in a cloud discharge in which there is more than one return stroke. It may step in its latter stages.

*Thermal ionization (of arc channels in air).*—A state of ionization in which temperature rather than electric gradient is most responsible for the degree of ionization. Connotes a high degree of conductivity, resulting in the order of 1,000 volts per meter longitudinal electric gradient.

*Virtual anode.*—The anode terminal of a plasma channel in space (air).

*Virtual cathode.*—The cathode terminal of a plasma channel in space (air).

This corona-burst effect may be somewhat visualized by reference to FIG. 22, where, for lack of more specific data, the distance to the ground plane is shown as twice the electrode separation.

In FIG. 22 the calculated size of the corona burst is shown for the time instant when the calculated total corona burst current $I_1$ is a maximum. $C_2$ is the capacitance between the corona burst and the grounded electrode, and $C_3$ the capacitance between the corona burst and the ground plane. These vary with time and were not calculated; but it is evident that $C_2$ is much smaller than $C_3$, so that $I_2$ would be much less than $I_1$.

The calculated value of $I_1$ and the measured value of $I_2$ are plotted on FIG. 23. $I_2$ is the initial "pip." It will be noted that the crest value of $I_1$ is about 13 times the crest value of $I_2$, and the total charge displaced by $I_1$ is about 5 times that recorded at $I_2$. Consequently the data afford further proof that the propagation of the corona burst is susceptible to analysis after the manner given above.

13. APPLICATION FOR LIGHTNING-PROOFING STRUCTURES

By way of recapitulation, according to the prestrike theory, as presented hereinbefore, there is a phenomenon preceding the return stroke of the lightning discharge. The earthward end of the approaching leader contains a very large amount of charge. When contact is established with an electric transmission-line tower, most of the charge is rapidly dumped into the tower top. This rapid movement of charge produces a high surge current and accompanying high tower-top potential.

More specifically, the "prestrike theory" predicts a steep-fronted, short-duration, high-magnitude current into a transmission-line tower, or ground wire, followed by a slower-fronted, longer-duration current a short time thereafter. The prestrike theory, as presented above, may be more concretely viewed by giving meaning to generic adjectives, such as conjecturing that the front of a prestrike may be within the range of 0.1 to 1.0 microsecond; and the prestrike duration from 0.5 to 2.0 microseconds. The return stroke following the prestrike may have a front of 2.0 to 10.0 microseconds and a duration (to one-half value) of 20 to 200 microseconds.

The conventional AIEE method of calculating transmission-line flashover performance due to lightning, as set forth in AIEE Transactions, vol. 69, Pt. II, 1950, pp. 1187–96, has brought about a large reduction of transmission-line flashovers due to lightning. This, of course, has been of tremendous economic value to the electrical utility industry. On the other hand, there have recently been a number of instances of high flashover rates which indicate that existing data and/or the existing theory must have significant deficiencies. It is beleived that the prestrike theory accounts for this difference. I believe that a substantial reduction and flashover rate previously referred to is due almost entirely to ground-wire shielding and reduction of tower-footing resistance.

The lightning-proofing preventative structures, hereinafter disclosed, are particularly directed toward reducing, or eliminating flashovers due to lightning strokes. Several different structures will be described which may be used singly, or in combination, to achieve a greater degree of invulnerability to lightning strokes. This question is of particular importance when the transmission-line is at extra high voltage (EHV), and since such lines handle large amounts of power, the economic value of the lightning-proofing structures is particularly important.

With the foregoing general principles in mind, and particularly considering the "corona burst" phenomenon of the prestrike theory, the value of the following disclosed structures will be apparent, particularly for towers having low footing resistance.

With reference to FIGS. 24 and 25 of the drawings, it will be noted that there is illustrated a capacity "hat," generally designated by the reference numeral 25, which will reduce the voltage across the insulator strings 26 by at least two processes. With a given amount of electrical charge available in the prestrike corona burst, any addition to the capacitance between the tower top 15 and ground 16 will reduce the tower-top potential, and hence the difference of potential between it and the line conductors 17. Secondly, the capacity "hat" 25 will increase the electrostatic coupling, more fully described hereinafter, between the tower top 15 and the line conductors 17, such that a smaller proportion of the tower-top potential will appear as a potential difference between it and the line conductors 17. The effectiveness of the capacity hat 25 is a function of the time to crest of the prestrike current, and if this is short, as predicted, this alteration of coupling factor could be quite important. In other words, the capacity hat 25 would, among other things, be effective principally against flashover from a prestrike, and would do this because of two effects. First, it increases the tower-top capacitance and thereby lessens the voltage which would be attained with a given leader-head charge. Secondly, the capacity hat 25 increases the coupling between the tower top 15 and the phase conductors 17. This increase of coupling is only effective for a short period of time due to the relatively small dimensions of the capacity hat 25, so that the short duration prestrike current effects would be reduced, but there would be little influence upon the effects due to the slower front of the return stroke.

It will be noted that the capacity hat 25 comprises a number of spreader arms of conducting material 25a, 25b ... being attached to the upright tower structure 27, which may be of conventional design. The increased capacitance between the capacity hat 25 and the ground 16 is indicated by the dotted capacitances $C_1$, $C_2$, $C_3$. As a result, the capacity hat 25 absorbs a portion of the electrical charge carried in the prestrike corona burst.

Preferably, the maximum linear length dimension "L," as well as the width dimension "W" of FIG. 24 is 100 feet. A desirable range having good results for the dimensions "L" and "W" is 20 to 100 feet, and a more desirable limited range of linear dimensions for the length "L" and the width "W" is 50 to 100 feet.

For certain applications, involving special circumstances, a maximum approximate ratio of linear dimensions "L" or "W" to the linear overall distance "D" between the free extremities of the crossarms 31 is 2 to 1. Thus, if "D" is 50 feet, the linear dimension "W" or "L" is substantially 100 feet.

As well known by those skilled in the art, the capacity hat 25 need not be rectangular, or square, as shown in FIG. 24 but could be of other variant configurations, such as round, oval, etc. Merely for cheapness of construction it is desirable to have a rectangular construction, as shown.

With reference to FIGS. 26 and 27 of the drawings, it will be observed that there is provided an improved crossarm design, generally designated by the reference numeral 30. As well known by those skilled in the art, in the ordinary transmission-line tower design, the suspension insulators 26 are attached to a gusset plate on the underside of the crossarm 31. This is undesirable from two standpoints. First, the outermost end 31a of the crossarm 31 is of small cross-sectional configuration, and width relatively sharp edges. With the tower-top potential raised millions of volts in potential (to "free" space and to ground), the conditions are very favorable to producing large corona burst at this location upon the occurrence of a prestrike, or even a fast-fronted return-stroke current. The corona burst envelops the insulators 26, and a little later in time, plasma channels will form which electrically bridge that portion of the insulator string 26 enveloped by the corona burst, leading to complete electrical breakdown.

Second, the direct attachment of the upper part of the insulator string 26 to the end of the crossarm 31 affords little alleviation of electrical field intensity several insulators away from the point of attachment. According to the improved structure 30 of FIGS. 26 and 27 of the drawings, remedial steps may be taken by overcoming both of the situations, and furthermore making a possible saving in tower heights inasmuch as the spacing of the crossarms 31 is dependent upon securing sufficient electrical strength between one suspended conductor 17 and the nearest metal of the crossarm 31 below it.

More particularly, the modified attaching arrangement, as set forth in FIGS. 26 and 27, enables the crossarm structure 30 to be used as a top grading ring. In this, the insulators 26 are suspended from the uppermost part 31b of the crossarm 31 rather than from the lower members 31c thereof so that they are within the "cage" formed by some of the crossarm members. The use of such structure 30 permits some reduction in tower height for a given number of insulators, while maintaining a striking distance "S" between the conductor 17 and the crossarm 31 below it commensurate with the strength of the insulator 26. In some areas subject to sleet buildup and subsequent rapid dropping of the sleet load, a closer spacing of the crossarms may not be deemed particularly feasible because of conductor whipping.

It will be observed that the point of attachment of the insulator string 26 is considerably within the outermost extremity 31a of the crossarm 31. This is very desirable because the extremity of the crossarm 31a is a region of high electrical field stress. Consequently, corona bursts take place from the outer extremities 31a of the crossarm 31, and if these embrace the insulator string 26, flashover is more apt to result. It should be understood that the distance "Z" between the point of attachment 30a of the insulator string 26 and the tower body 27 is the usual safe clearance distance and the crossarm length (Y+Z) is increased in the proposed construction.

More specifically, it is desired to have the dimension "Y" of FIG. 26 no more than 10 feet; and, preferably, the maximum distance of "X" is 3 feet. This will secure the benefits of the invention by taking advantage of the "cage" effect of the crossarm yet not positioning the extremity 30a of the insulator string 26 too close to the tower structure 27, nor decreasing the dielectric gap axially of the insulator string 26.

With reference to the lightning-proofing structures of FIGS. 28–30, it will be observed that cantilever rods 40 extend from each of the two ends of top crossarms 31 and the bottom crossarms 41. These cantilever rods 40 should preferably be of the "whip antenna type" that is of tapering cross-sectional area. Their extension "T" from the junction ends of the crossarms 31, 41 may range up to 50 feet in length. A desirable range is 10 feet to 50 feet with a more limited preferable range being 10 feet to 40 feet. Their effect partakes of some of the features of hereinbefore-described structures, inasmuch as they give a capacity-hat effect, reduce the extent of the corona burst around the top part of the insulator string 26, and increase the electrostatic coupling between the tower top 15 and the line conductors 17.

The angle $\theta$ (FIG. 28) between the cantilever rods 40 may be varied as desired. In the particular instance where the angle $\theta$ approaches zero, it will be obvious that the cantilever-rod construction will merely assume the form of a longitudinally-extending rod 40a, as illustrated in FIG. 28A of the drawings.

The distance "A" of FIG. 29 has a maximum value of 30 feet. With reference to FIG. 30, the maximum value of the dimension "B" is 40 feet.

FIG. 31 illustrates an electrostatic shielding arrangement in which outriggers 50 from the top crossarm 31 are used to support a widely-spaced addition to the ground-wire system 10. With this arrangement, the coupling of the tower-top 15 and the ground-wire system 10 to the phase conductors 17 can be greatly increased in the vicinity of the tower 27. It is important to note that experience has been that most flashovers are over insulator strings 26 at the tower, and not between the ground wire 10 and phase conductors 17 between towers 27.

For some applications, the outriggers 50 may be from 5 to 10 feet in length (dimension "Q" of FIG. 32).

Again the amount of effectiveness of such a structure depends upon the steepness and duration of the lightning-current wave, insofar as a maximum difference of voltage across the insulator string 26 is concerned. On the other hand, for a given value of voltage difference across the insulator string 26, the impulse-withstand value is greater with the structure shown because it reduces the extent of the corona burst around the insulator string 26. The "cage" wires 51 may be attached to the ground wire 10 at a distance of up to 200 feet from the center-line of the tower 27 (dimension "F" of FIG. 33). The system is applicable to designs of either one or two ground wires 10. Also the cage system may consist of only four wires as shown by the solid lines 51, or by eight wires utilizing the four additional wires 51a shown by the dotted lines. Also, by constructing a cantilever-bar arrangement 52 longitudinally of the towers about thirty feet long (dimension "H" in FIG. 34), a similar cage can be constructed around the lower crossarm 41. Such an arrangement is illustrated in FIG. 34 of the drawings and uses cage wires 52a extending from the ends of the lower crossarms 41 to the cantilever bars 52. Cantilever rods 40a may optionally be used, as shown in FIGS. 32 and 33, previously described.

With reference to FIG. 35 of the drawings, it will be noted that the lightning-proofing structure 60 comprises cage wires 60a, 60b, 60c, etc. secured to the power conductor 17, and being longitudinally symmetrical about the insulator string 26. Again, the objective is to increase the electrostatic coupling to the ground wire 10 in the tower-top systems, and to minimize the amount of corona burst projected around the insulator string 26. The lateral asymmetry, as evidenced by the recess 61 of the cage 60 in plan view, is to avoid high stress between the conductor 17 and the tower 27 when the conductors 17 are deflected toward the tower 27 by the wind. As with the grounded cage structure of FIGS. 31–33, the efficacy of the arrangement can be increased by intermediate cage wires 62, as shown by the dotted lines. The maximum length of the dimension "J" of FIG. 35 is 20 feet, and of the width "K" 10 feet.

FIG. 36 illustrates a modified type of arrangement in which a vertically extending mast 70 is constructed upwardly of the tower top 15. Consideration of FIGURES 6 and 7 will readily show that the electrical gradients under a leader head vary greatly with the height of the leader head above ground. Consequently, if a given tower 27 is destined to be struck in a particular storm, the voltage difference across the insulator string 26 will be greatly reduced if drainage of the leader head commences when it is still at a considerable height above the tower 27. This is because of lowered induced charges on the line conductors 17. Somewhat offsetting this favorable influence, the higher the mast 70 above the tower top 15, there is a slight increase in probability of a stroke interception that might otherwise might have gone to ground harmlessly.

If the prestrike theory turns out to be valid, and there are definite indications in that direction, a whip pipe mast 70 extending above a tower 27 would exert relatively little additional attractive influence on an approaching lightning leader. This follows from the prestrike theory which predicts that the zigs and zags of the lightning path are dictated by random gaseous electronic phenomena over the major portion of its length. The steps in the leader will only be swerved when an object projecting above the earth's surface has a sufficient combination of height and breadth as to considerably intensify the electric flux lines between the leader head and the object in question. A thin whip 70 will not cause such an increase in electric flux lines until the leader has approached quite closely. With such a close approach, a corona burst or leader head of opposite sign to the descending leader will emanate from the upward tip of the whip mast 70. When this occurs, the electric lines of force from the leader head will be intensified in the direction of the corona burst from the tip of the mast 70. Thenceforth, it is almost inevitable that the next step of the leader will be toward the mast 70 and eventuate in a stroke to it. There is insufficient knowledge at the present time to assign a length to the whip mast 70 with full surety. However, a value of 20 to 100 feet seems like a reasonable compromise between increasing the distance of the closest approach of the leader head to the tower, while still not appreciably increasing the probability of a strike. This figure is selected because it is about one half of the modal length of the steps in the lightning stroke. A desirable limited range for the mast height "U" of FIG. 36 is 20 to 50 feet. A desirable approximate value for the mast height "U" is substantially 40 feet.

Ordinary grading rings have been used in the past to increase the 60-cycle flashover of insulator strings 26, and the moderate impulse overvoltages obtainable with "man-made lightning." They were largely abandoned because such tests did not show an appreciable gain in insulator-string flashover voltage. More lately, grading rings have been applied to the lower end of the insulator strings (the point of attachment of the line conductors), primarily to reduce radio-interference voltages.

It has been found that on transmission lines having low tower-footing resistances that when insulator-string flashovers occur, the arc path has tended to follow the contour of the porcelain of the insulators, rather than to follow essentially the "tight string" path around the insulators. Flashovers which follow the porcelain contour are known to be steep in wave front, and in some laboratory impulse tests, this type of flashover has been obtained.

With reference to FIGS. 37 and 38 of the drawings, it will be observed that there are provided grading rings 74, 75 secured to the ends of the insulator string assemblage 26, and extending toward each other in the manner as shown in FIG. 38. Because of the possibility of the line conductor 17 swaying in the wind toward the tower structure 27, preferably the lower grading ring 75 is asymmetrical, as indicated by the recess portion 75a of FIG. 37. Braces 76 may converge the grading rings 74, 75 toward each other in the manner shown. The maximum diameter "N" of the grading ring 74 is ten feet. The maximum diameter of the lower grading ring 75 is 6 feet, as indicated by the dimension "M" of FIG. 37. The overlap distance "D" of FIG. 38 is preferably no greater than ⅓ the diameter of the upper grading ring 74, thereby approaching a limit of 3⅓ feet.

Figure 41:
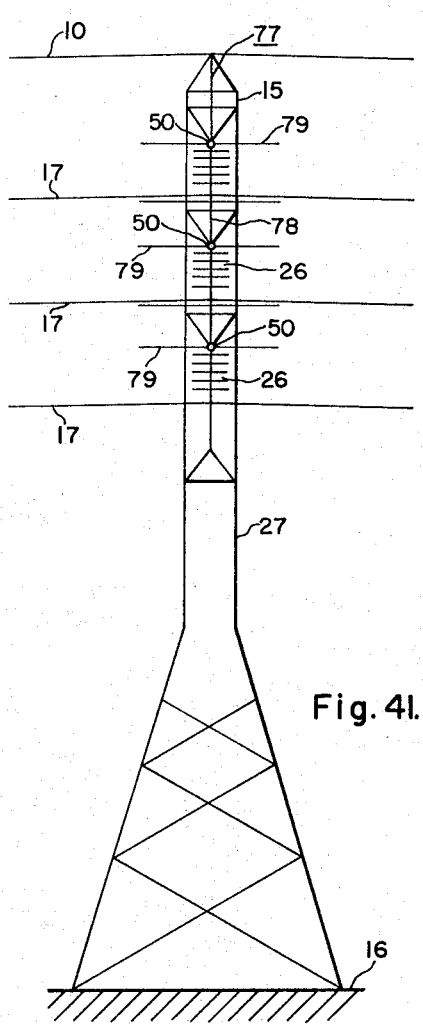

FIGS. 39–41 illustrate a modified type of shielding arrangement, generally designated by the reference numeral 77, utilized for not only facilitating shielding of the phase conductors 17, but also to increase the electrostatic coupling between the tower top 15 and the phase conductor 17 over the insulator strings 26. As shown, there is provided a pair of vertically-extending relatively rigid shield rods, or structural members 78, extending upwardly on opposite sides of the tower structure 27 and having jutting laterally thereof, at various points in the general horizontal plane of the upper ends of the insulator strings 26, cantilever rods 79 extending generally longitudinally of the phase conductors 17, as shown more clearly in FIG. 41 of the drawings.

The cantilever shield rods 79 are preferably from 60 to 80 feet in length measured from one free extremity of the shield rod 79 to the free extremity of the adjoining shield rod 79, as indicated by the distance "L" of FIG. 39 of the drawings, when the structural members 78 are rigid, or bowed, as indicated by the position 78a. For the case where the rodding 78 is not so rigid, the length "L" may be confined to 20 feet, to account for wind deflection in the direction of the phase conductors 17. The distance "R" of FIG. 39 may range up to 8 feet in length.

Such a shielding structure not only provides for low lightning outage rates, but also increases the electrostatic coupling between the tower top 15 and the phase conductor 17 so as to impress a lower proportion of the tower-top voltage across the insulator strings 26.

The lightning-proofing structures of the present invention may not only be applied to transmission tower structures for overhead exposed lines, but also may be applied to substation structures, and equipment, as indicated by FIGS. 42 and 43 of the drawings.

As shown in FIGS. 42 and 43, a substation, generally designated by the reference numeral 80, has terminating on structure 81 associated therewith a phase conductor 17. To increase the electrostatic coupling between the grounded supporting structure 82 and the phase conductor 17, there is disposed a four-sided cantilever arrangement, generally designated by the reference numeral 84. As more clearly shown in FIG. 42, each shielding structure 84 comprises a pair of crossed cantilever rods 85, which may be joined together at the junction point 86. The junction points 86 of the four-sided shield structures are preferably supported by the upright grounded support 82, as shown. The effect of the cantilever-rod structures 84, with reference to the phase conductor 17, is to increase the electrostatic coupling between the grounded structure 82, including the cantilever-rod arrangements 84, and the phase conductor 17 to thereby reduce the crest voltage imposed upon the phase conductor 17 during lightning-stroke phenomena.

The distance B of FIG. 42 may have a maximum value of 30 to 40 feet, or with two columns 82a, as shown in FIG. 42A, with resulting more rigidity, may approach 100 feet as a maximum.

FIG. 31 showed a way of extending the time of protection by "angling" auxiliary ground wires 51 from the top cross-arm 31 to the principal ground wire 10. This was done to avoid the difficulty of short circuits by sleet unloading of phase conductors. The worse condition is obviously likely to occur near midspan where the upward whipping of phase conductors would be greatest. Another arrangement, for providing increased benefits, is illustrated in FIG. 44 which is a top plan view of a modified-type electrostatic coupling arrangement with two ground wires. As shown in FIG. 44, two ground wires 10a, 10b are utilized, which arrangement is much superior to that in which a single ground wire 10 is employed, with respect to intercepting a lightning stroke in preference to a phase conductor 17. The ground wires 10a, 10b are attached to a cross-arm upright 80 (FIG. 44A) at the top of the tower, sometimes called a goat-head, and pulled closer together by cross-wires 81. Additional ground wires 10c are "angled" from the top phase conductor cross-arm to the ground wires at a distance "P" of 50 to 100 feet longitudinally of the line, in a manner similar to FIG. 33. The closest point in a direction normal to the earth's surface is close to the tower structure 27, as shown, where the vertical movement of the phase conductors 17 from ice unloading is relatively small. Alternately, if the ground wires have a considerably larger spacing than the outside phase wires, the cross-wires 81 can be eliminated.

The arrangement shown in FIG. 44 is a three-phase line of horizontal configuration. For the particular case where two three-phase circuits of vertical configuration are employed, the central phase conductor 17 of FIG. 44 would, of course, be eliminated.

FIGS. 46–48 illustrate a modified type of cantilever-bar arrangement in which a star-like capacity arrangement 90 is employed secured adjacent the top of the insulator-string assemblages 26 in the general plane of the cross-arms 31. As shown, the star-like electrostatic coupling arrangement 90 comprises a plurality of cantilever rods 40 terminating at a junction point 91 and serving to increase the electrostatic coupling between the tower top 15 and the phase conductor 17. As a result, the voltage impressed across the insulator strings 26 is reduced by the increased value of the coupling factor, as more fully explained hereinafter.

It will be observed that in the structural arrangement of FIGS. 46–48 a transversely-extending cantilever bar 40b extends transversely of the right-of-way and in a general direction which is generally perpendicular to the longitudinal direction of the phase conductor 17. The additional transverse cantilever rod is of benefit in that it lessens the distortion of the electric fields around the insulator string, particularly if a lightning stroke is approaching the tower transversely rather than co-axially. Corona discharges will takes place from the tip of the transverse cantilever rod rather than from the cross-arm tip to which the insulators are suspended.

The dimensions of the cantilever rod arrangement of FIGS. 46–48 may be the same as in FIGS. 28–30.

It is to be clearly understood that various combinations of the aforesaid structural arrangements may be employed individually, or collectively together to increase the electrostatic coupling between the tower top 15 and the phase conductor 17 for creating the beneficial effects hereinbefore described relating to lightning-stroke phenomena.

The cantilever bars 40, 40b of the configuration illustrated in FIG. 46 may range from a minimum length to a maximum of substantially 50 feet measured from the free ends of the cantilever rods 40, 40b to the junction point 91. Preferably the rods 40, 40b individually may range in length from 10 to 50 feet.

From the foregoing structures, it will be apparent that there have been provided a number of arrangements for increasing the electrostatic coupling between the tower top and the phase conductors whereby during a lightning stroke to the tower top a smaller proportion of the tower top potential will appear as a potential difference between the tower top and the line conductors.

The invention may additionally be applied to substation structures in like manner so as to increase the electrostatic coupling between the grounded supporting structures and the phase conductors.

An application of the invention to conventional transmission tower structures will reduce the number of outages occurring on the transmission system. It will be interesting to compute the increase in the electrostatic coupling between the tower top and the phase conductors for a number of arrangements, as considered hereinafter in order to theoretically visualize the definite improvement which ensues.

The general proposition to be considered is: with a lightning stroke to the tower-top 15, the various phase conductors 17 will lie in the electrostatic fields of the parallel conductor systems of the (1) ground-wire to phase conductor, (2) cantilever rod to phase conductor, or (3) if there are two sets of cantilever rods to phase conductor.

Initially, the fact that the ground wire 10 is continuous between towers 27, and the cantilever rods have a finite length will be disregarded, and the capacitances will be computed on a "per foot" basis.

The method of calculation is that given in the "Transmission and Distribution Reference Book" (1950) in chapter 23 "Coordination of Power and Communication Systems." Equations 12, page 750 of the aforesaid book were used with the physical diagram of FIG. 8–a of the chapter, and the results expressed according to FIG. 8–b of said chapter. The ground wire or "cantilever rod" is conductor "a," the top phase conductor 17 of FIG. 51 of the present disclosure by "b" and the earth by reference numeral 16. Additional numerical values are added to FIG. 8–b of said chapter, these being the difference voltage between a and b in percent, and the voltage from b to ground for a tower-top voltage on conductor "a" of 100%. The small difference of potential from the extreme tower-top 15 to the top cross-arm 31 is neglected.

When the tower 27 is struck by lightning, the upper parts (tower-top, ground wire, and/or cantilever rods), will change in potential with respect to earth 16 and adjacent space. Corona envelopes, as developed in the aforesaid prestrike theory, will form around the various surfaces. With respect to the ground wire 10 and/or the cantilever rods 40, the diameter of the envelope will be such that the relation $$Gp = \frac{E \times 0.434}{R \log_{10}(2h/r)}$$

is satisfied, where $Gp$ is the "critical" gradient for air, approximately 30,000 volts per centimeter, $h$ is the height of the conductor above earth, in centimeters, $E$ is the tower-top potential in volts, and $R$ is the radius of the corona envelope, also in centimeters. The derivation of this expression is set forth in "A Theory Regarding the Generation of Radio Noise on High-Voltage Transmission Lines" by S. B. Griscom, reprinted from volume XXIII, Proceedings of the American Power Conference, 1961.

To get an approximate idea of the situation, E was taken as 3,000,000 volts, whereupon for a ground-wire height $h$ of 100 feet, R becomes about ½ foot. This radius was used throughout, whether for the ground wire 10 or the cantilever rod 40. Because of the logarithmic relationships, the tedious calculations, which rigorous treatment demand, were thus avoided without losing the point of the analysis.

The results of the analysis are given in FIGS. 52–55 in terms of the per unit capacitances and the significant voltages, previously noted.

The voltage reductions across the insulator string 26 are spectacular, with a maximum of $$\frac{70.4}{22.0} = 3.2$$

times, from FIG. 52 to FIG. 55.

It is evident that in progressing from FIG. 52 to FIG. 55, the capacitance from conductor $a$ to conductor $b$ has progressively increased while that from $b$ to ground has progressively decreased. This results in the increased coupling previously referred to. Another way of expressing the situation is that the flow of current from $a$ to $b$ has increased lessening the voltage difference. The higher the voltage the greater the current, because the radius of the corona envelope surrounding conductor $a$ is thereby increased. Conductor $b$ is not grounded, so the current from $a$ to $b$ is limited by the capacitance from $b$ to ground.

As well known by those skilled in the art, the voltage surge produced on a midspan of a transmission-line by lightning does not appear simultaneously at all points on the transmission-line; instead, it appears at successively later intervals of time as the distance from the point of the stroke at midspan increases. Furthermore, the magnitude and shape (voltage vs. time) of the surge remains approximately the same at all points of a uniform line, but are simply displaced in time phase. In effect then, the surge, which appears as a voltage-time wave on the line at midspan where the stroke occurred, becomes two identical voltage-distance waves on the line which travel at uniform velocity in opposite directions from the point of origin at midspan.

For the case, however, in which the lightning stroke occurs at the top 15 of the transmission-line tower 27, a voltage-surge traveling wave passes downwardly along the tower structure and is reflected at ground level 16. In other words, as well known, a change occurs in a traveling wave when it reaches the junction between two conductors of different surge impedance, for example, the transmission-tower structure and the ground itself. The original wave, resulting from the lightning stroke to the top of the tower structure, called the "incident" wave, gives rise to two waves at the transition point, namely at the ground level 16. A "refracted" wave continues into the ground, and a "reflected" wave starts traveling back upwardly along the transmission tower structure 27 to the upper end 15 thereof at the point of stroke.

As well known, if, at any instant, E is the voltage of the incident wave at the junction, then $$E \times (Z_2 - Z_1)/(Z_2 + Z_1)$$

is the voltage of the reflected wave, where $Z_1$ is the surge impedance of the first conductor (over which the surge arrived) and $Z_2$ is the surge impedance of the second conductor. The voltage of the refracted wave at the junction is the sum of the voltages of the incident and reflected waves, that is, it equals $$\frac{E(2Z_2)}{(Z_2 + Z_1)}$$

Reflected and refracted current waves accompany the corresponding voltage waves, the constant of proportionality being the surge impedance $Z_1$ or $Z_2$ of the conductor the wave is traveling on. A reversal of direction of the voltage wave, without change in polarity, reverses the direction of flow of current.

In the particular case considered, namely the incident traveling voltage wave moving downwardly along the transmission-tower structure 27 to ground level 16, $Z_2$ is equal to zero (the tower being shorted to ground), and the voltage at the junction point, namely at ground level of course, equals zero. The reflected voltage wave, which passes upwardly along the tower structure 27 to the initiating point of the lightning stroke at the top 15 of the tower, will tend to cancel the voltage surge wave at the initiating stroke point. As a result, the hazardous or critical time interval is the length of time that it takes the traveling wave to move downwardly along the tower structure to the ground level point and to return to the initiating stroke point.

However, with reference to the aforesaid cases, it must be borne in mind that the voltage reductions last only for the length of the cantilever rods, times 2 in terms of the velocity of light. Thus, taking the latter to be 1000 ft. per microsecond, 50 foot long cantilever rods would yield these benefits for $$\frac{2 \times 50}{1000} = 0.1$$

microsecond. On the other hand, it must be borne in mind that a 100 foot high tower with the top crossarm 80 feet above ground would only permit a voltage for $$\frac{2 \times 80}{1000} = 0.16$$

microsecond. Most of the benefits indicated in FIGS. 53–55 would therefore be realized, considering that losses were neglected.

From the foregoing description of the invention, it will be apparent that there are provided a number of structural arrangements in which the electrostatic coupling between the tower top and the line conductors, or phase conductors 17, is increased, so that a smaller proportion of the tower-top potential will appear as a potential difference between it and the line conductors 17. The effectiveness of the increased electrostatic coupling arrangements is a function of the time to crest of the prestrike current and, as predicted by the aforesaid theory, this time is short. As a result, the alteration of the coupling factor is very important.

Although there have been illustrated and described specific structures, it is to be clearly understood that the same were merely for the purpose of illustration, and that changes and modifications may readily be made therein by those skilled in the art without departing from the spirit and scope of the invention.

I claim as my invention:

1. An upstanding metallic transmission-tower structure having one or more grounded support members for supporting insulator-string assemblages, one or more insulator-string assemblages for carrying one or more phase conductors and secured in depending relation to said one or more grounded support members, a plurality of rod-like metallic cantilever members in unitary relation disposed in a generally horizontal plane passing in close proximity through the point of attachment of said one or more insulator-string assemblages, whereby to increase the electrostatic coupling between said one or more grounded support members and the one or more phase conductors to reduce the potential difference across the insulator-string assemblages during lightning-stroke phenomena, and cause the voltage across the insulators to be more uniform, whereby the entire string will have greater electrical strength.

2. The combination of claim 1, wherein the maximum length (T) of the rod-like cantilever members is 50 feet.

3. An upstanding, metallic transmission-tower structure having one or more grounded support members for supporting insulator-string assemblages, one or more insulator-string assemblages for carrying one or more phase conductors and secured in depending relation to said one or more grounded support members, a star-like unitary metallic cantilever rod structure in a generally horizontal plane passing close to the point of attachment to at least one of said grounded support members, whereby to increase the electrostatic coupling between said one or more grounded support members and the one or more phase conductors to reduce the potential difference across the insulator-string assemblages during lightning-stroke phenomena.

4. In combination, an insulator-string assemblage supporting a phase conductor, a tower structure, electrostatic coupling means for the end of an insulator-string assemblage attached to said tower structure comprising one or more metallic cantilever rods supported by the tower structure and extending in a generally horizontal plane passing in close proximity through the point of attachment of said insulator-string assemblage to the tower structure, whereby to increase the electrostatic coupling between said tower structure and the phase conductor to reduce the potential difference across the insulator-string assemblages during lightning-stroke phenomena.

5. In combination, a tower structure, an insulator string assemblage, a metallic crossed cantilever-rod construction for attaching the end of the insulator-string assemblage to the tower structure, supporting means for said crossed cantilevered-rod construction supporting the same in a generally horizontal plane from the tower structure, and the overall length of each of the crossed cantilever rods from the merger and attachment point to the tower structure being in the range from 10 feet to 50 feet.

6. The combination of claim 5, wherein the angle $\theta$ between the crossed cantilever rods varies from more than 0° to 90°.

7. In combination, an upright grounded transmission-tower structure having one or more laterally-extending crossarms, a phase-conductor-carrying insulator-string assemblage secured to one of said crossarms, and means for reducing the voltage difference across said one insulator-string assemblage during lightning-stroke phenomena including one or more metallic cantilever rods extending in a generally horizontal plane close to the point of attachment of the insulator-string assemblage to the crossarms.

8. In combination, an upright grounded transmission-tower structure having one or more laterally-extending crossarms, a phase-conductor-carrying insulator-string assemblage secured to one of said crossarms, and means for reducing the voltage difference across said one insulator-string assemblage during lightning-stroke phenomena including a pair of oppositely-extending metallic cantilever rods supported at their junction point, and the length of each of the cantilever rods from the outer free end thereof to the supported junction point being from 10 feet to 50 feet.

9. The combination of claim 8, wherein the cantilever rods extend parallel to the phase conductors.

10. In combination, an upright grounded transmission-tower structure having one or more laterally-extending crossarms, a phase-conductor-carrying insulator-string assemblage secured to one of said crossarms, and means for reducing the voltage difference across said one insulator-string assemblage during lightning-stroke phenomena including a horizontally-extending star-like metallic cantilever-rod construction secured adjacent the point of attachment of said one insulator-string assemblage to said crossarm.

11. The combination of claim 10, wherein the overall length of each cantilever rod varies from 10 feet to 50 feet.

12. A transmission-tower structure including a plurality of laterally-extending metallic crossarm structures carrying insulator-string assemblages, a phase conductor carried by each insulator-string assemblage, a laterally-disposed and enveloping metallic cantilever-rod electrostatic shielding cage structure including generally vertically-extending rods tying the ends of the crossarms and horizontally-extending cantilever rods disposed outwardly of the phase conductors, whereby to increase the electrostatic coupling between the tower structure and the phase conductors and also to intercept laterally-directed lightning strokes to the tower in the vicinity of the tower, and reducing the electric field surrounding the insulators due to laterally-directed lightning strokes, whether they terminate on the tower or to nearby earth.

13. The combination of claim 12, wherein the length of the horizontally-extending cantilever rods is from 10 to 20 feet from the free end to the junction point of the vertical rods.

14. Means for assisting in lightning proofing a metallic transmission-tower structure carrying phase conductors from vertically spaced laterally-extending crossarms including longitudinally-extending metallic cantilever bars supported from the tower adjacent an upper crossarm and grounded cage wires from the cantilever bars to points adjacent the extremities of a lower crossarm, whereby during a lightning stroke to the tower top a smaller proportion of the tower-top potential will appear as a potential difference between the tower top and the line conductors.

15. In combination, a metallic transmission-tower structure for carrying phase conductors and a ground wire, a metallic whip-type mast extending upwardly from the tower structure to drain electrostatic charge, and the mast being from 20 to 100 feet in length.

16. In combination, a metallic transmission-tower structure including supporting means, an insulator-string assemblage supporting a phase conductor, and a metallic cage-wire structure on the phase conductor adjacent the lower free end of the insulator-string assemblage to increase the electrostatic coupling between the phase conductor and the tower top.

17. The combination of claim 16, wherein the longitudinal terminating points of said cage-wire structure on the phase conductor are not over 20 feet from the insulator-string attachment point.

18. The combination of claim 17, wherein the lateral extent of the cage-wire structure is not over 10 feet in overall width.

19. In combination, a tower structure, an insulator string assemblage, a metallic cantilever rod construction for attaching the end of the insulator string assemblage to the tower structure, supporting means for said metallic cantilever-rod construction supporting the same in a generally horizontal plane from the tower structure, said cantilever-rod structure comprising two oppositely-extending metallic rods from the attachment point to the tower structure, and the overall length of each of the two metallic rods being in the range from 10 feet to 50 feet.

20. Substation lightning-proofing structure including means (81) terminating a phase conductor (17), an upstanding grounded metallic supporting structure (82) disposed in the near vicinity of said phase conductor (17) and supporting a metallic grounded cantilever-rod structure (84), said metallic grounded cantilever-rod construction (84) comprising at least two generally oppositely-extending cantilever rods (85) attached together (86) and extending in a plane generally parallel to said phase conductor (17), whereby the electrostatic coupling between the supporting structure (82) and the phase conductor (17) will be increased.

21. The combination of claim 20, wherein the distance (B) of each cantilever rod may have a maximum value of 40 feet.

22. The combination of claim 20, wherein the metallic grounded cantilever-rod structure (84) is disposed on all four sides of the phase conductor (17).

23. The combination of claim 20, wherein the cantilever-rod construction (84) is a metallic crossed rod arrangement.

24. The combination of claim 20, wherein the upstanding grounded metallic supporting structure comprises spaced members (82a, 82a) and the maximum value of the individual rods 85 may approach 100 feet as a maximum value.

(References on following page)

References Cited

UNITED STATES PATENTS

| | | | |
|---|---|---|---|
| 407,660 | 7/1889 | Hill | 174—2 |
| 1,236,563 | 8/1917 | Holmgren et al. | 317—61 |
| 1,743,526 | 1/1930 | Cage | 174—2 |
| 2,036,225 | 4/1936 | Lusignan | 174—2 |
| 2,927,148 | 3/1960 | Palomino et al. | 174—2 |

FOREIGN PATENTS

| | | |
|---|---|---|
| 220,210 | 3/1962 | Austria. |
| 871,790 | 1/1942 | France. |
| 482,209 | 9/1929 | Germany. |
| 621,873 | 11/1935 | Germany. |
| 330,000 | 5/1930 | Great Britain. |
| 80,482 | 4/1919 | Switzerland. |
| 177,045 | 7/1935 | Switzerland. |

OTHER REFERENCES

Braymer, "Designing Tomorrow's Transmission," Electrical World, March 11, 1957, pp. 91–95.

LARAMIE E. ASKIN, *Primary Examiner*.